US012175769B2

(12) United States Patent
Nishijima et al.

(10) Patent No.: US 12,175,769 B2
(45) Date of Patent: Dec. 24, 2024

(54) TARGET VEHICLE RECOGNITION APPARATUS AND PROCESSING METHOD OF THE TARGET VEHICLE RECOGNITION APPARATUS

(71) Applicant: TOYOTA JIDOSHA KABUSHIKI KAISHA, Toyota (JP)

(72) Inventors: Masakazu Nishijima, Ebina (JP); Wataru Sasagawa, Susono (JP); Kazuyuki Fujita, Gotemba (JP); Minami Sato, Ebina (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 228 days.

(21) Appl. No.: 17/948,608

(22) Filed: Sep. 20, 2022

(65) Prior Publication Data

US 2023/0102058 A1   Mar. 30, 2023

(30) Foreign Application Priority Data

Sep. 28, 2021 (JP) .................... 2021-158260

(51) Int. Cl.
*B62D 15/02* (2006.01)
*G06T 7/70* (2017.01)
*G06V 20/56* (2022.01)
*G06V 20/58* (2022.01)

(52) U.S. Cl.
CPC ......... *G06V 20/58* (2022.01); *B62D 15/0265* (2013.01); *G06T 7/70* (2017.01); *G06V 20/588* (2022.01); *G06T 2207/30256* (2013.01); *G06T 2207/30261* (2013.01); *G06V 2201/08* (2022.01)

(58) Field of Classification Search
CPC ............... B62D 15/0265; G06T 7/70; G06T 2207/30256; G06T 2207/30261; G06V 20/58; G06V 20/588; G06V 2201/08
USPC ................................................... 701/41
See application file for complete search history.

(56) References Cited

U.S. PATENT DOCUMENTS

| | | | |
|---|---|---|---|
| 9,405,727 | B2 | 8/2016 | Nagata |
| 9,669,760 | B2 | 6/2017 | Hanita et al. |
| 9,898,929 | B2 | 2/2018 | Harada et al. |
| 11,175,673 | B2 | 11/2021 | Eshima |

(Continued)

FOREIGN PATENT DOCUMENTS

| | | |
|---|---|---|
| JP | 2005-326963 A | 11/2005 |
| JP | 2019-524525 A | 9/2019 |
| WO | 2018/005441 A2 | 1/2018 |

*Primary Examiner* — Abby Y Lin
*Assistant Examiner* — Hossam M Abd El Latif
(74) *Attorney, Agent, or Firm* — Dinsmore & Shohl LLP

(57) ABSTRACT

A target vehicle recognition apparatus for recognizing a target vehicle as a target to be avoided by steering control of a host vehicle detects a stopped vehicle located in front of the host vehicle, determines whether the stopped vehicle is in a forward-facing state to the host vehicle or a rearward-facing state to the host vehicle, determines whether the stopped vehicle is in a right boundary line deviation state crossing a right boundary line of a travel lane of the host vehicle, a left boundary line deviation state crossing a left boundary line of the travel lane, and recognizes the target vehicle for steering control based on a captured image captured by a front camera of the host vehicle and each of the determination results.

5 Claims, 15 Drawing Sheets

(56) References Cited

U.S. PATENT DOCUMENTS

| | | | |
|---|---|---|---|
| 2013/0226445 A1* | 8/2013 | Nagata | G06F 17/00 |
| | | | 701/300 |
| 2016/0167580 A1* | 6/2016 | Hanita | G01S 17/93 |
| | | | 701/301 |
| 2019/0146516 A1* | 5/2019 | Eshima | G08G 1/143 |
| | | | 701/23 |
| 2020/0207341 A1* | 7/2020 | Inoue | B60W 30/18145 |
| 2020/0231146 A1* | 7/2020 | Miyano | B60W 30/09 |
| 2020/0391731 A1* | 12/2020 | Cheon | B60W 10/20 |
| 2021/0061350 A1* | 3/2021 | Kinoshita | B60W 10/18 |
| 2021/0284141 A1 | 9/2021 | Sugaya | |
| 2021/0284237 A1 | 9/2021 | Miyano et al. | |
| 2021/0291820 A1 | 9/2021 | Inoue et al. | |
| 2022/0153260 A1* | 5/2022 | Hamada | G06V 20/588 |
| 2022/0308225 A1* | 9/2022 | Chiba | G01S 17/86 |

\* cited by examiner

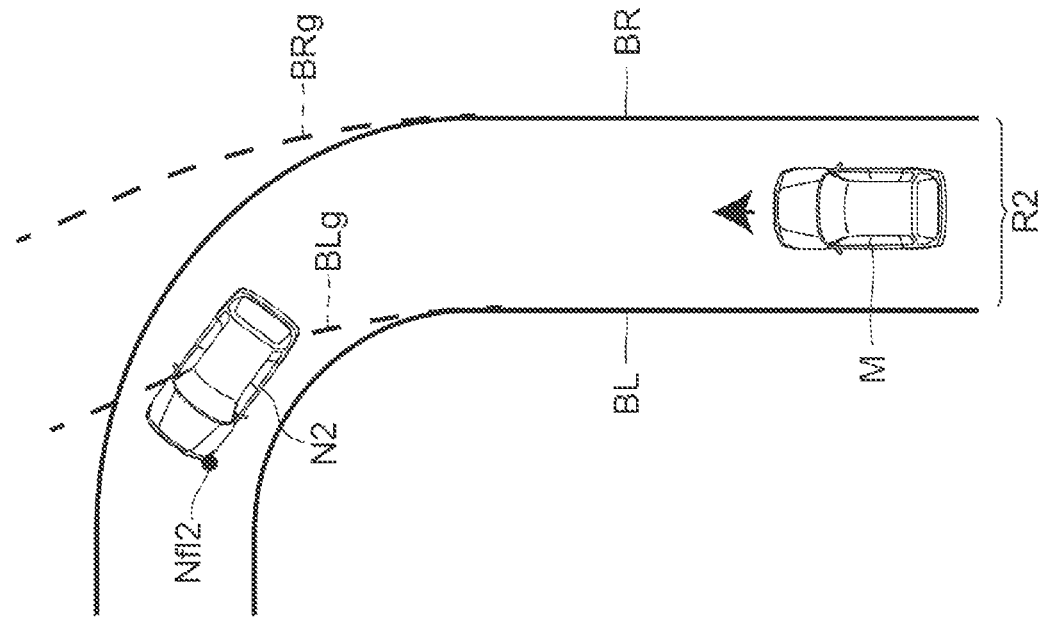
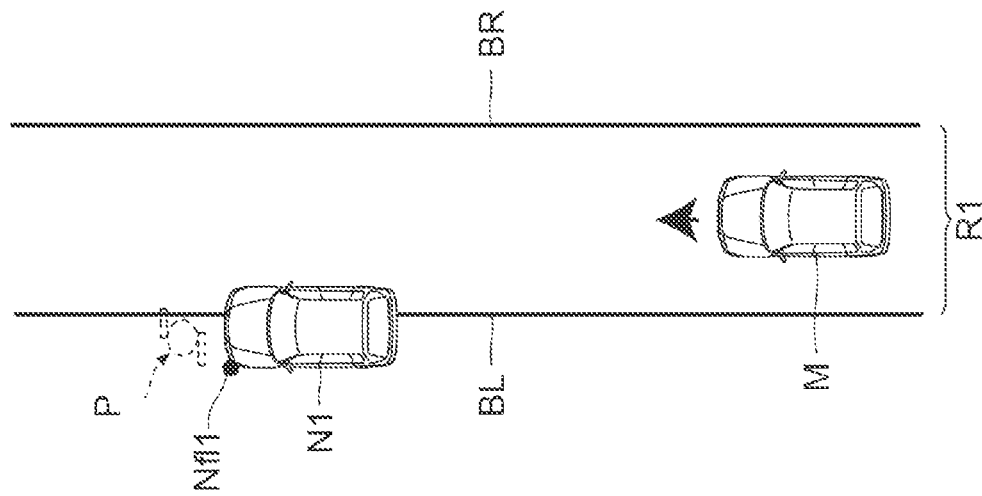

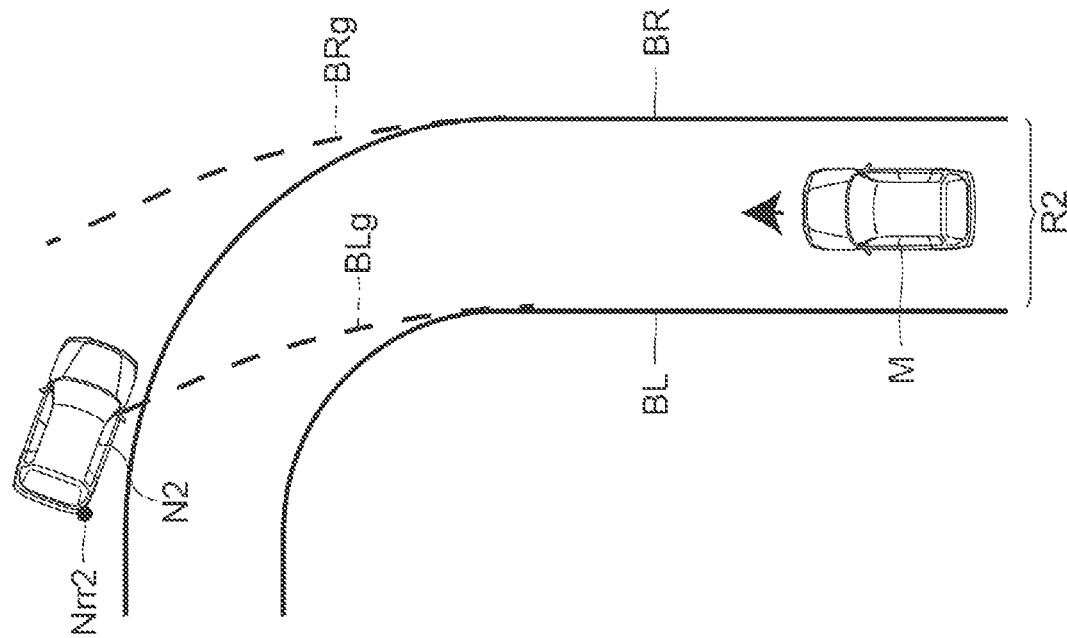
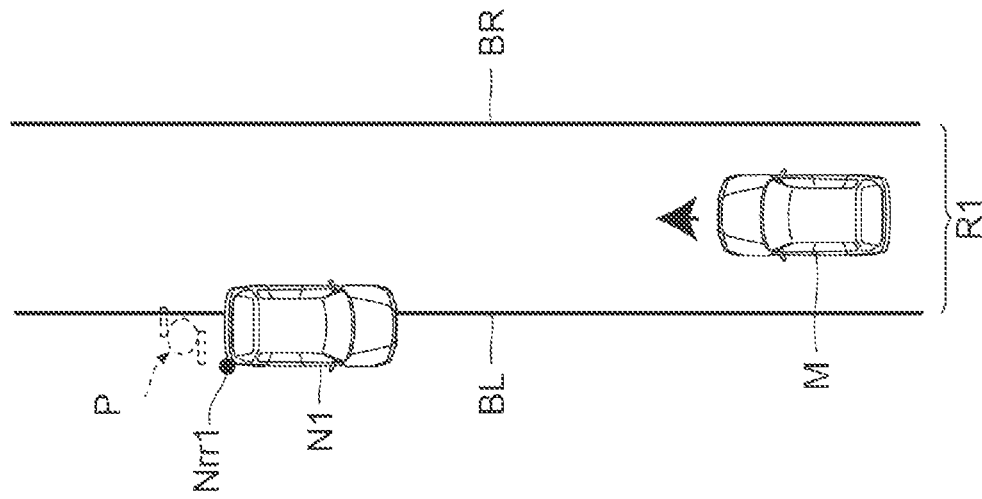

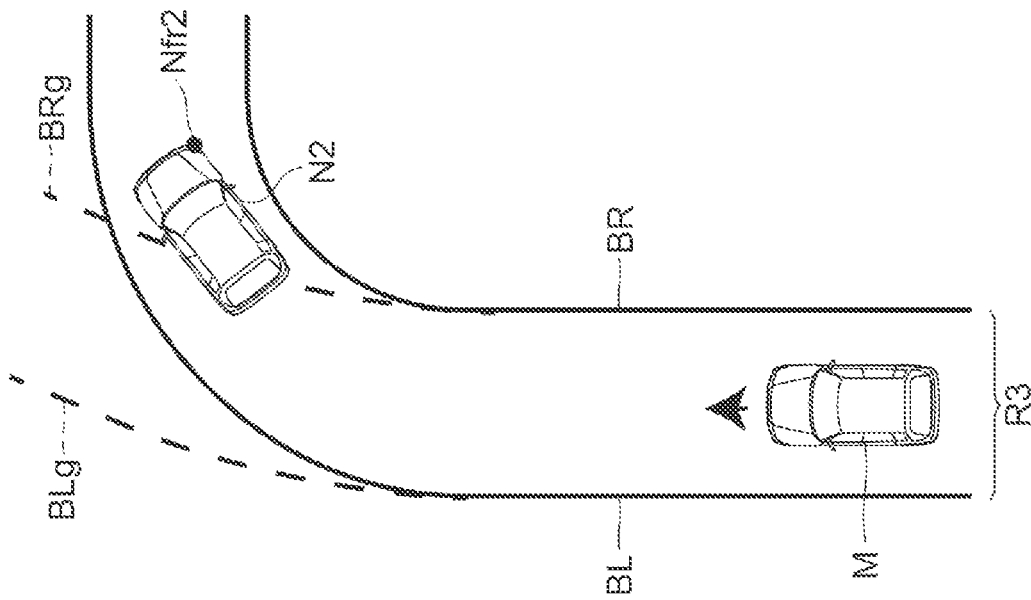
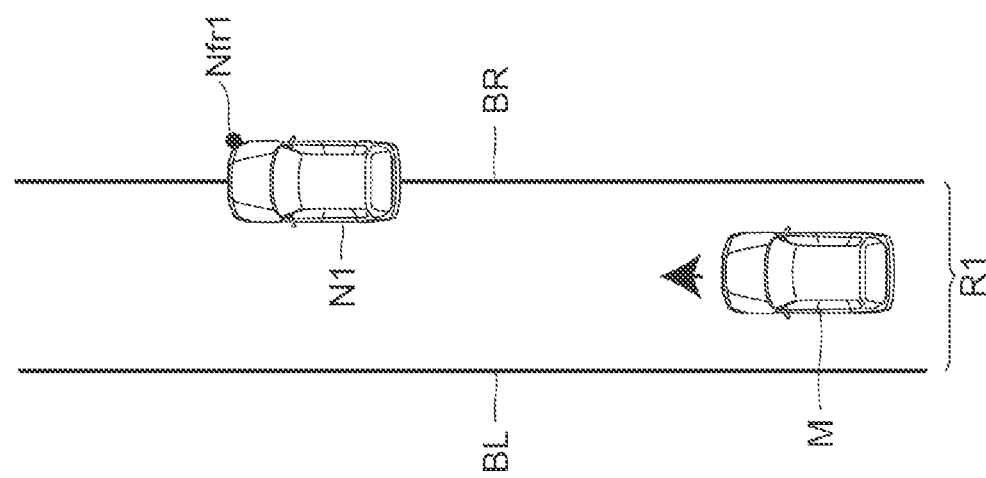

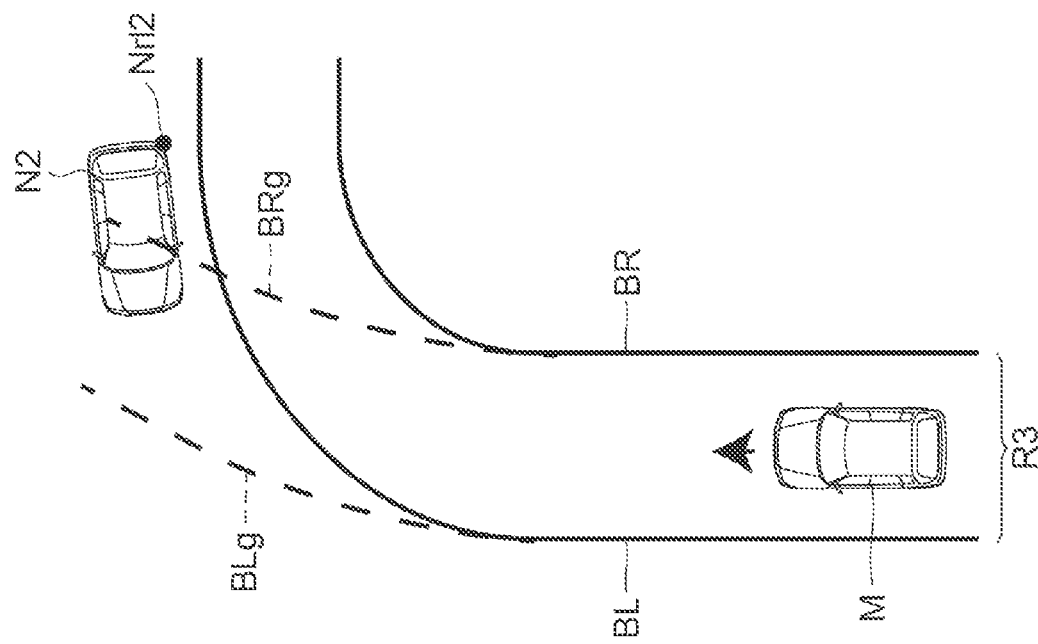
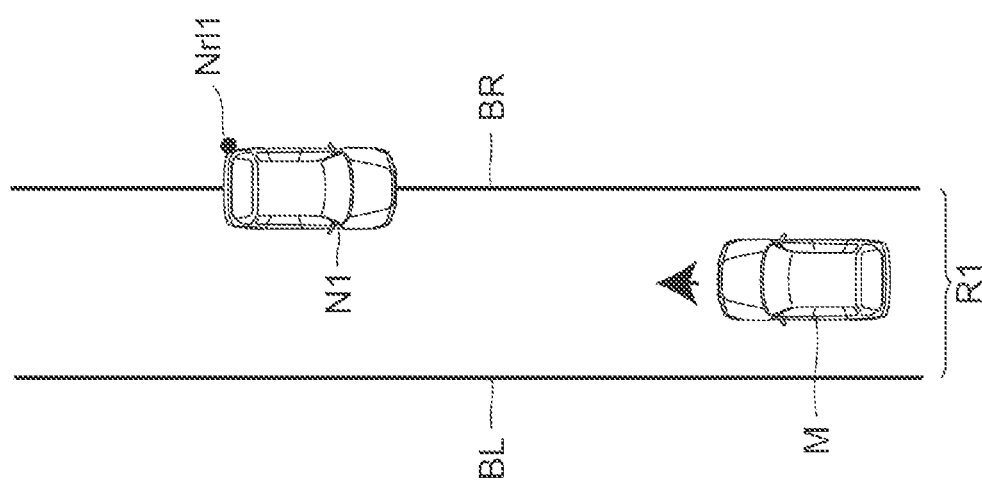

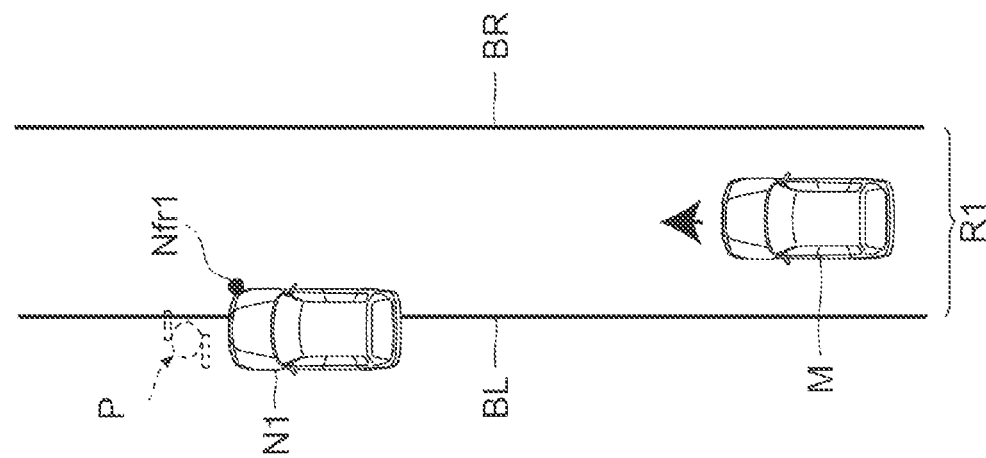
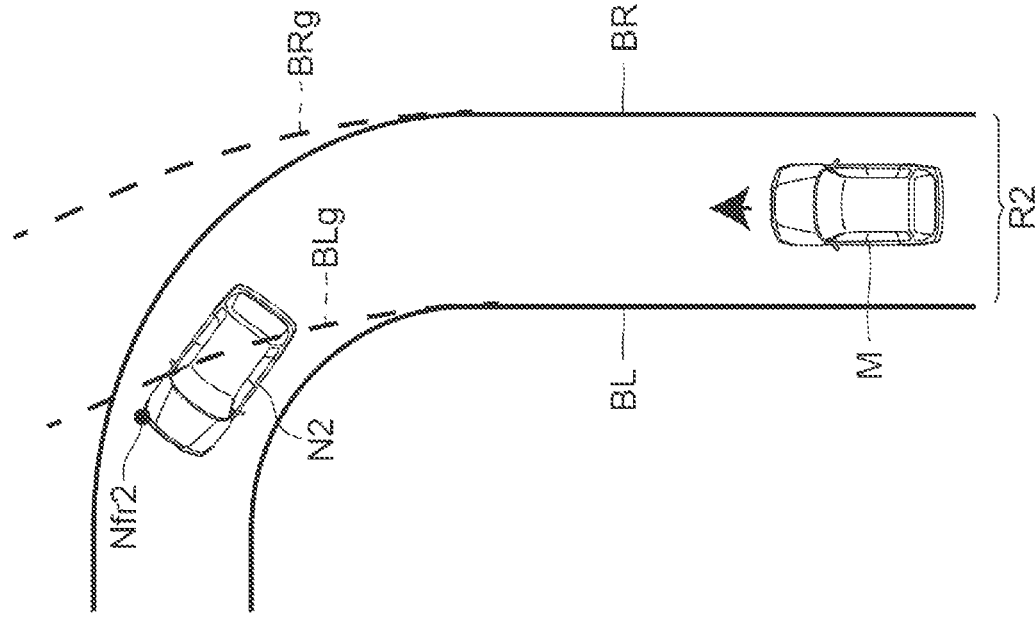

TARGET VEHICLE RECOGNITION APPARATUS AND PROCESSING METHOD OF THE TARGET VEHICLE RECOGNITION APPARATUS

CROSS-REFERENCE TO RELATED APPLICATION

This application claims the benefit of priority from Japanese Patent Application No. 2021-158260, filed Sep. 28, 2021, the entire contents of which are incorporated herein by reference.

TECHNICAL FIELD

The present disclosure relates to a target vehicle recognition apparatus and a processing method of the target vehicle recognition apparatus.

BACKGROUND

In the related art, Japanese Unexamined Patent Application Publication No. 2019-524525 is known as technical document relating to a target vehicle recognition apparatus for recognizing a target vehicle to be avoided by means of vehicle steering control. This publication discloses that steering control of a host vehicle is performed to allow the host vehicle to pass by a parked vehicle by taking a certain distance from the parked vehicle considering the possibility of a pedestrian rushing into the road from behind the parked vehicle parked at least partially protruding into the travel lane of the vehicle.

SUMMARY

The above-mentioned publication does not disclose a method for accurately recognizing a target vehicle (a stopped vehicle stopped at a road shoulder or the like and at least partially protruding into a travel lane of a host vehicle) which is a target to be avoided by steering control. Contemplated is use of a front camera of a host vehicle to recognize a target vehicle as a target to be avoided by steering control. When the preceding vehicle on the travel lane of the host vehicle approaches a curve, the preceding vehicle may appear to be positioned as if it were protruding out of the boundary line of the travel lane seen from an image captured by the host vehicle. In addition, as the distance from the preceding vehicle increases, the detection accuracy of the speed of the preceding vehicle decreases, and the preceding vehicle may be erroneously recognized as a stopped vehicle. If the preceding vehicle is erroneously recognized as the target vehicle for the steering control, the host vehicle performs unnecessary steering control. In view of above, a method for accurately recognizing the target vehicle for the steering control is demanded.

BRIEF DESCRIPTION OF THE DRAWINGS

One aspect of the present disclosure is a target vehicle recognition apparatus for recognizing a target vehicle to be avoided by steering control of a host vehicle. The target vehicle recognition apparatus includes: a stopped vehicle detection unit configured to detect a stopped vehicle located in front of the host vehicle based on at least one of a captured image of a front camera of the host vehicle and a detection result of a front radar sensor of the host vehicle, an orientation determination unit configured to determine whether the stopped vehicle is in a forward-facing state to the host vehicle or in a rearward-facing state to the host vehicle based on a captured image of the front camera, a deviation state determination unit configured to determine whether the stopped vehicle is in a right boundary line deviation state crossing a right boundary line of a travel lane of the host vehicle, whether the stopped vehicle is in a left boundary line deviation state crossing a left boundary line of the travel lane, or whether the stopped vehicle is neither the right boundary line deviation state nor the left boundary line deviation state, based on the captured image, and a target vehicle recognition unit configured to recognize the target vehicle for the steering control based on the captured image, a determination result of the orientation determination unit, and a determination result of the deviation state determination unit. The target vehicle recognition unit does not recognize the stopped vehicle as the target vehicle for the steering control if the deviation state determination unit determines that the stopped vehicle is neither the right boundary line deviation state nor the left boundary line deviation state. the target vehicle recognition unit recognize the stopped vehicle as the target vehicle if the orientation determination unit determines that the stopped vehicle is in the rearward-facing state and the deviation state determination unit determines that the stopped vehicle is in the left boundary line deviation state and a front left end of the stopped vehicle is not included in the captured image, and does not recognize the stopped vehicle as the target vehicle if the front left end of the stopped vehicle is included in the captured image. The target vehicle recognition unit recognize the stopped vehicle as the target vehicle if the orientation determination unit determines that the stopped vehicle is in the rearward-facing state and the deviation state determination unit determines that the stopped vehicle is in the right boundary line deviation state and a front right end of the stopped vehicle is not included in the captured image, and does not recognize the stopped vehicle as the target vehicle if the front right end of the stopped vehicle is included in the captured image. The target vehicle recognition unit recognize the stopped vehicle as the target vehicle if the orientation determination unit determines that the stopped vehicle is in the forward-facing state and the deviation state determination unit determines that the stopped vehicle is in the left boundary line deviation state and a rear right end of the stopped vehicle is not included in the captured image, and does not recognize the stopped vehicle as the target vehicle if the rear right end of the stopped vehicle is included in the captured image. The target vehicle recognition unit recognize the stopped vehicle as the target vehicle if the orientation determination unit determines that the stopped vehicle is in the forward-facing state and the deviation state determination unit determines that the stopped vehicle is in the right boundary line deviation state and a rear left end of the stopped vehicle is not included in the captured image, and does not recognize the stopped vehicle as the target vehicle if the rear left end of the stopped vehicle is included in the captured image.

According to the target vehicle recognition apparatus of an aspect of the present disclosure, when a preceding vehicle or an oncoming vehicle of a host vehicle is turning a curve, it is possible to avoid erroneously recognizing the preceding vehicle or the oncoming vehicle turning a curve as a target vehicle for steering control and to appropriately recognize a target vehicle as a target to be avoided by steering control based on a captured image.

Figure 1:
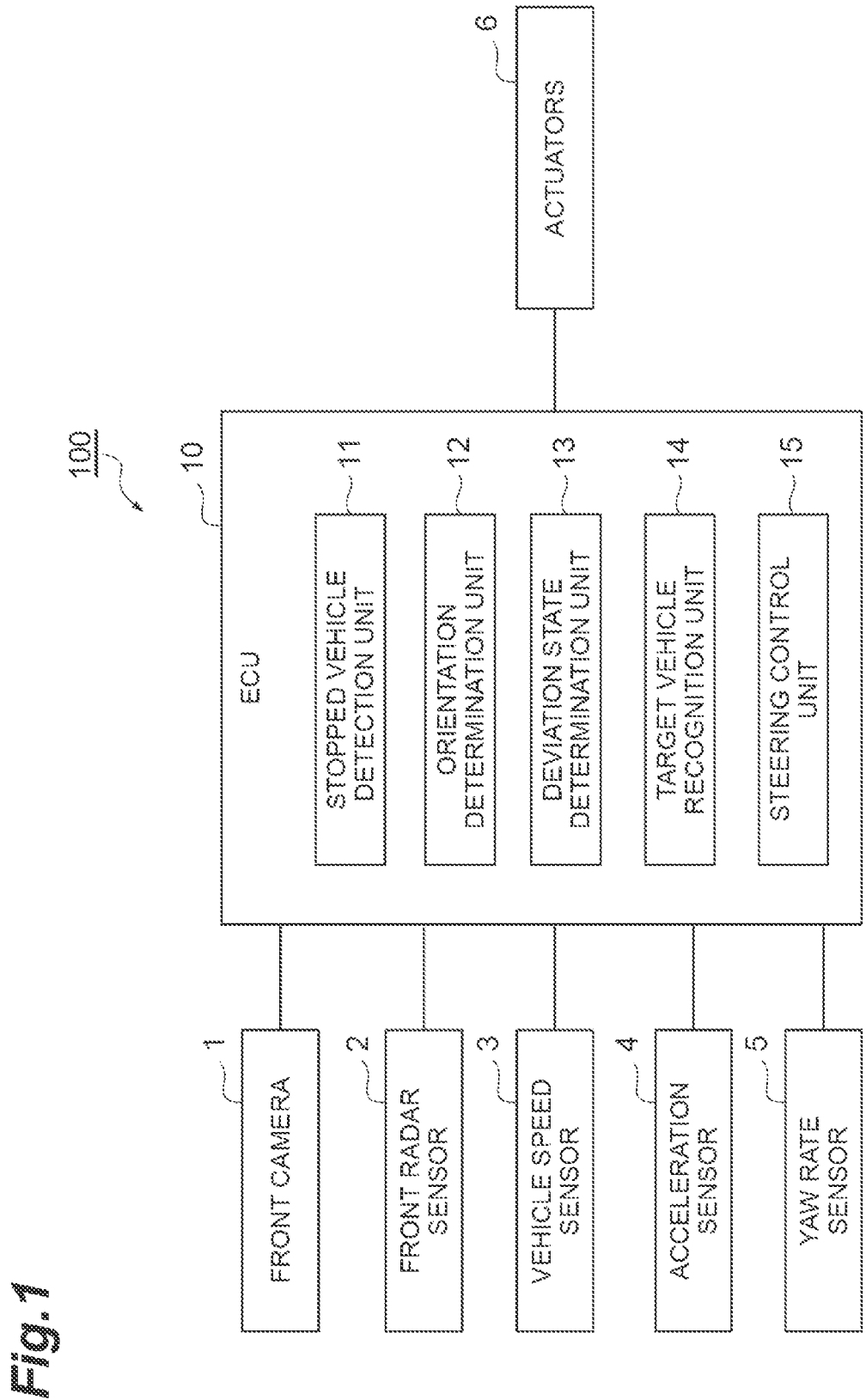

Another aspect of the present disclosure is a target vehicle recognition apparatus for recognizing a target vehicle to be avoided by steering control of a host vehicle. The target vehicle recognition apparatus include: a stopped vehicle detection unit configured to detect a stopped vehicle located in front of the host vehicle based on at least one of a captured image of a front camera of the host vehicle and a detection result of a front radar sensor of the host vehicle, an orientation determination unit configured to determine whether the stopped vehicle is in a forward-facing state to the host vehicle or in a rearward-facing state to the host vehicle based on a captured image of the front camera, a deviation state determination unit configured to determine whether the stopped vehicle is in a right boundary line deviation state crossing a right boundary line of a travel lane of the host vehicle, whether the stopped vehicle is in a left boundary line deviation state crossing a left boundary line of the travel lane, or whether the stopped vehicle is neither the right boundary line deviation state nor the left boundary line deviation state, based on the captured image, and a target vehicle recognition unit configured to recognize the target vehicle for the steering control based on the captured image, a determination result of the orientation determination unit, and a determination result of the deviation state determination unit. The target vehicle recognition unit does not recognize the stopped vehicle as the target vehicle if the orientation determination unit determines that the stopped vehicle is in the rearward-facing state and the deviation state determination unit determines that the stopped vehicle is in the left boundary line deviation state and a front right end of the stopped vehicle is not included in the captured image, and recognize the stopped vehicle as the target vehicle if the front right end of the stopped vehicle is included in the captured image. The target vehicle recognition unit does not recognize the stopped vehicle as the target vehicle if the orientation determination unit determines that the stopped vehicle is in the rearward-facing state and the deviation state determination unit determines that the stopped vehicle is in the right boundary line deviation state and a front left end of the stopped vehicle is not included in the captured image, and recognize the stopped vehicle as the target vehicle if the front left end of the stopped vehicle is included in the captured image. The target vehicle recognition unit does not recognize the stopped vehicle as the target vehicle if the orientation determination unit determines that the stopped vehicle is in the forward-facing state and the deviation state determination unit determines that the stopped vehicle is in the left boundary line deviation state and a rear left end of the stopped vehicle is not included in the captured image, and recognize the stopped vehicle as the target vehicle if the rear left end of the stopped vehicle is included in the captured image. The target vehicle recognition unit does not recognize the stopped vehicle as the target vehicle if the orientation determination unit determines that the stopped vehicle is in the forward-facing state and the deviation state determination unit determines that the stopped vehicle is in the right boundary line deviation state and a rear right end of the stopped vehicle is not included in the captured image, and recognize the stopped vehicle as the target vehicle if the rear right end of the stopped vehicle is included in the captured image.

According to the target vehicle recognition apparatus of another aspect, in a case where a preceding vehicle or an oncoming vehicle of a host vehicle is turning a curve, it is possible to avoid erroneously recognizing the preceding vehicle or the oncoming vehicle turning a curve as a target vehicle for steering control and to appropriately recognize a target vehicle as a target for steering control based on a captured image.

The other aspect of the present disclosure is a processing method of a target vehicle recognition apparatus for recognizing a target vehicle to be avoided by steering control of a host vehicle. The processing method of target vehicle recognition apparatus includes: a stopped vehicle detection step for detecting a stopped vehicle located in front of the host vehicle based on at least one of a captured image of a front camera of the host vehicle and a detection result of a front radar sensor of the host vehicle, an orientation determination step for determining whether the stopped vehicle is in a forward-facing state to the host vehicle or in a rearward-facing state to the host vehicle based on a captured image of the front camera, a deviation state determination step for determine whether the stopped vehicle is in a right boundary line deviation state crossing a right boundary line of a travel lane of the host vehicle, whether the stopped vehicle is in a left boundary line deviation state crossing a left boundary line of the travel lane, or whether the stopped vehicle is neither the right boundary line deviation state nor the left boundary line deviation state, based on the captured image, and a target vehicle recognition step for recognize the target vehicle for the steering control based on the captured image, a determination result of the orientation determination step, and a determination result of the deviation state determination step. The target vehicle recognition step does not recognize the stopped vehicle as the target vehicle for the steering control if the deviation state determination unit determines that the stopped vehicle is neither the right boundary line deviation state nor the left boundary line deviation state. The target vehicle recognition step recognize the stopped vehicle as the target vehicle if the orientation determination unit determines that the stopped vehicle is in the rearward-facing state and the deviation state determination unit determines that the stopped vehicle is in the left boundary line deviation state and a front left end of the stopped vehicle is not included in the captured image, and does not recognize the stopped vehicle as the target vehicle if the front left end of the stopped vehicle is included in the captured image. The target vehicle recognition step recognize the stopped vehicle as the target vehicle if the orientation determination unit determines that the stopped vehicle is in the rearward-facing state and the deviation state determination unit determines that the stopped vehicle is in the right boundary line deviation state and a front right end of the stopped vehicle is not included in the captured image, and does not recognize the stopped vehicle as the target vehicle if the front right end of the stopped vehicle is included in the captured image. The target vehicle recognition step recognize the stopped vehicle as the target vehicle if the orientation determination unit determines that the stopped vehicle is in the forward-facing state and the deviation state determination unit determines that the stopped vehicle is in the left boundary line deviation state and a rear right end of the stopped vehicle is not included in the captured image, and does not recognize the stopped vehicle as the target vehicle if the rear right end of the stopped vehicle is included in the captured image. The target vehicle recognition step recognize the stopped vehicle as the target vehicle if the orientation determination unit determines that the stopped vehicle is in the forward-facing state and the deviation state determination unit determines that the stopped vehicle is in the right boundary line deviation state and a rear left end of the stopped vehicle is not included in the captured image, and does not recognize the stopped vehicle as the target vehicle if the rear left end of the stopped vehicle is included in the captured image.

According to the processing method of the target vehicle recognition apparatus, when a preceding vehicle or an oncoming vehicle of a host vehicle is turning a curve, it is possible to avoid erroneously recognizing the preceding vehicle or the oncoming vehicle turning a curve as a target vehicle for steering control and to appropriately recognize a target vehicle as a target for steering control based on a captured image.

According to each aspect of the present disclosure, it is possible to appropriately recognize a target vehicle as a target for steering control based on a captured image.

BRIEF DESCRIPTION OF THE DRAWINGS

FIG. 1 is a block diagram illustrating a steering control apparatus according to a first embodiment.

FIG. 2A is a diagram illustrating a first example in the case of where a vehicle is recognized as a target vehicle.

FIG. 2B is a diagram illustrating a first example of a case where the vehicle is not recognized as a target vehicle.

Figure 3:
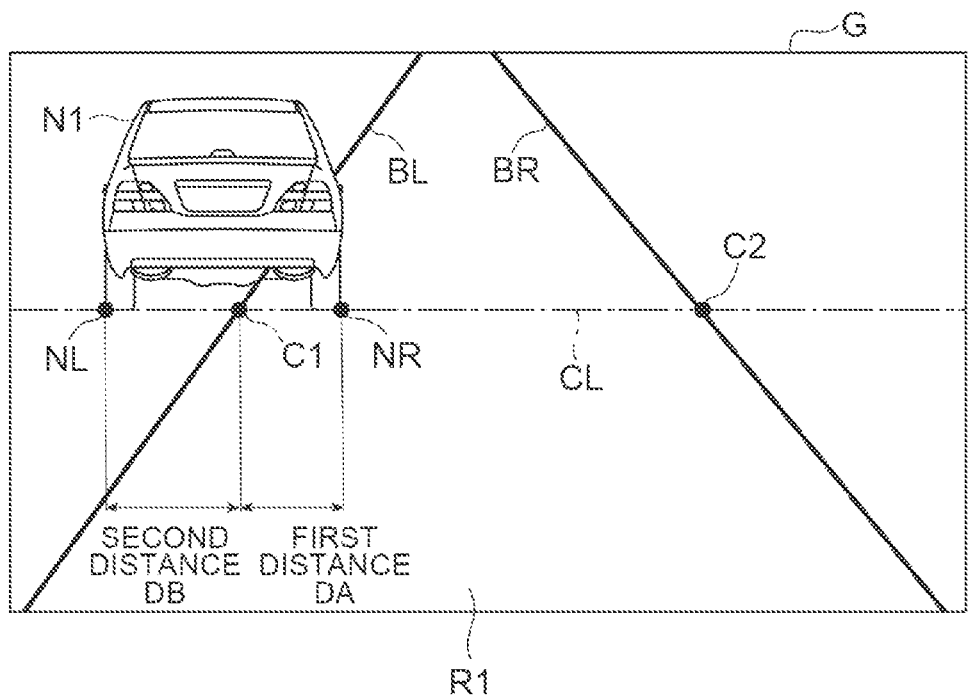

FIG. 3 is a diagram illustrating an example of a captured image corresponding to FIG. 2B.

FIG. 4A is a diagram illustrating a second example of the case where the vehicle is recognized as a target vehicle.

FIG. 4B is a diagram illustrating a second example of a case where the vehicle is not recognized as a target vehicle.

FIG. 5A is a diagram illustrating a third example in the case where the vehicle is recognized as a target vehicle.

FIG. 5B is a diagram illustrating a third example in which the vehicle is not recognized as recognized as a target vehicle.

FIG. 6A is a diagram illustrating a fourth example of the case where the vehicle is recognized as a target vehicle.

FIG. 6B is a diagram illustrating a fourth example in which the vehicle is not recognized as a target vehicle.

Figure 7:
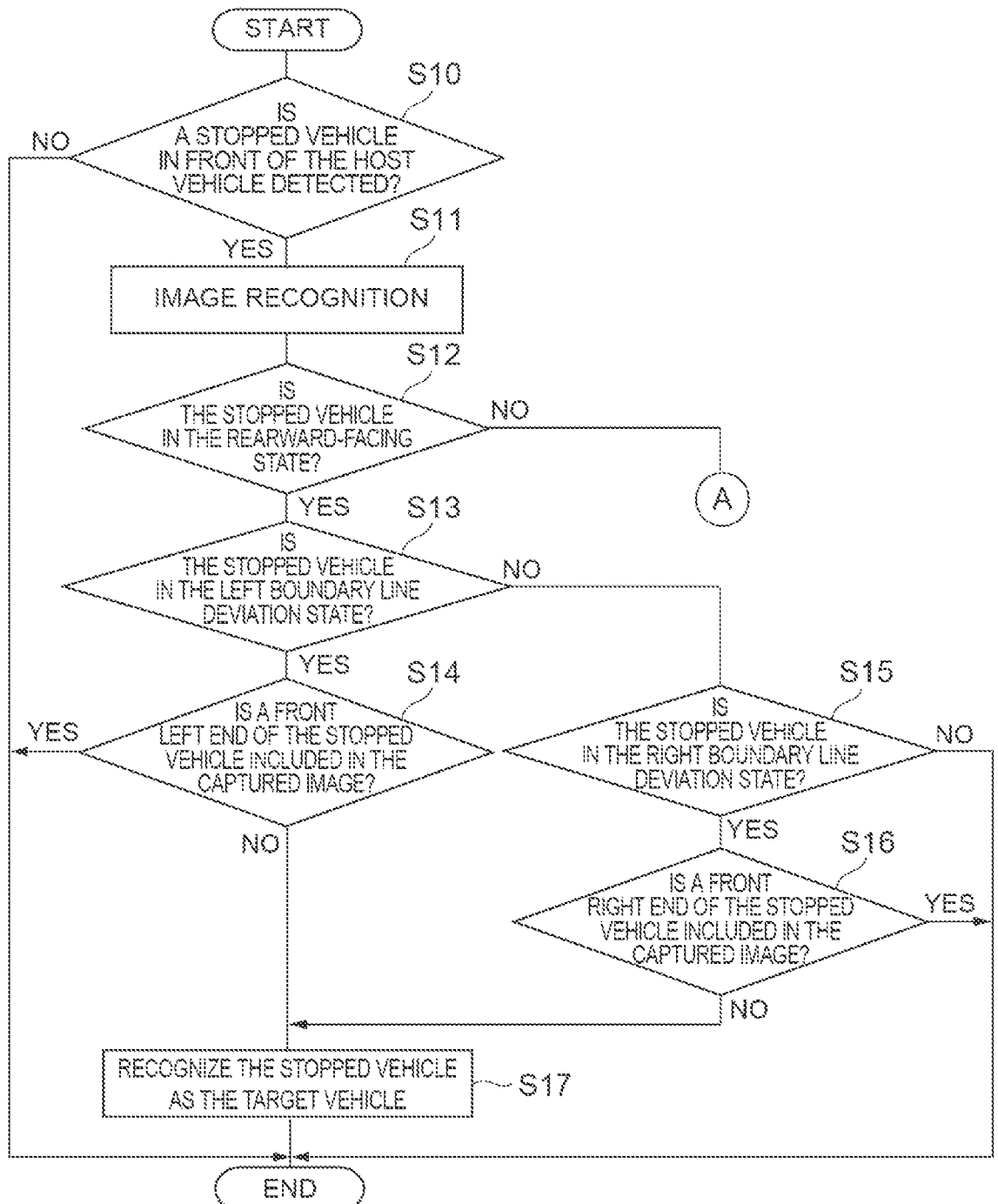

FIG. 7 is a flowchart illustrating an example of the target vehicle recognition processing.

Figure 8:
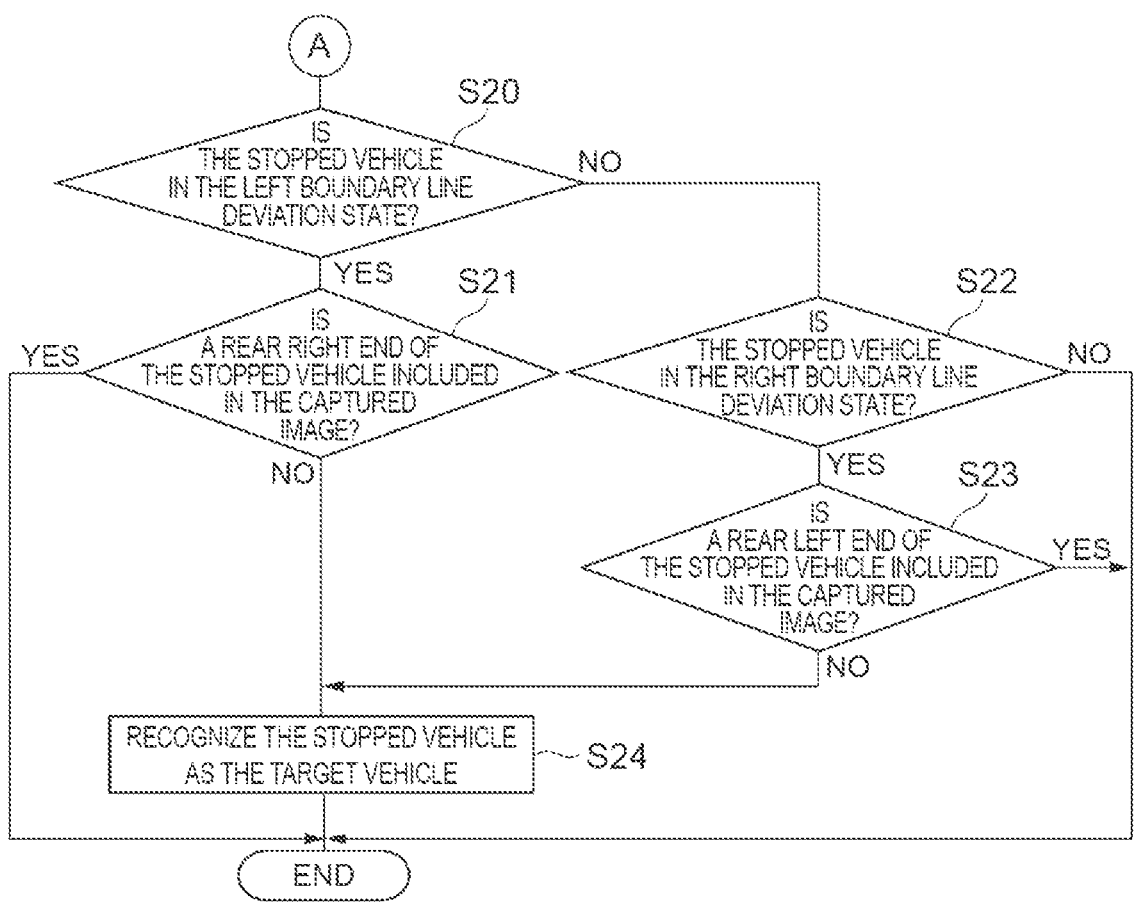

FIG. 8 is a flowchart illustrating the continuation of the target vehicle recognition processing.

Figure 9:
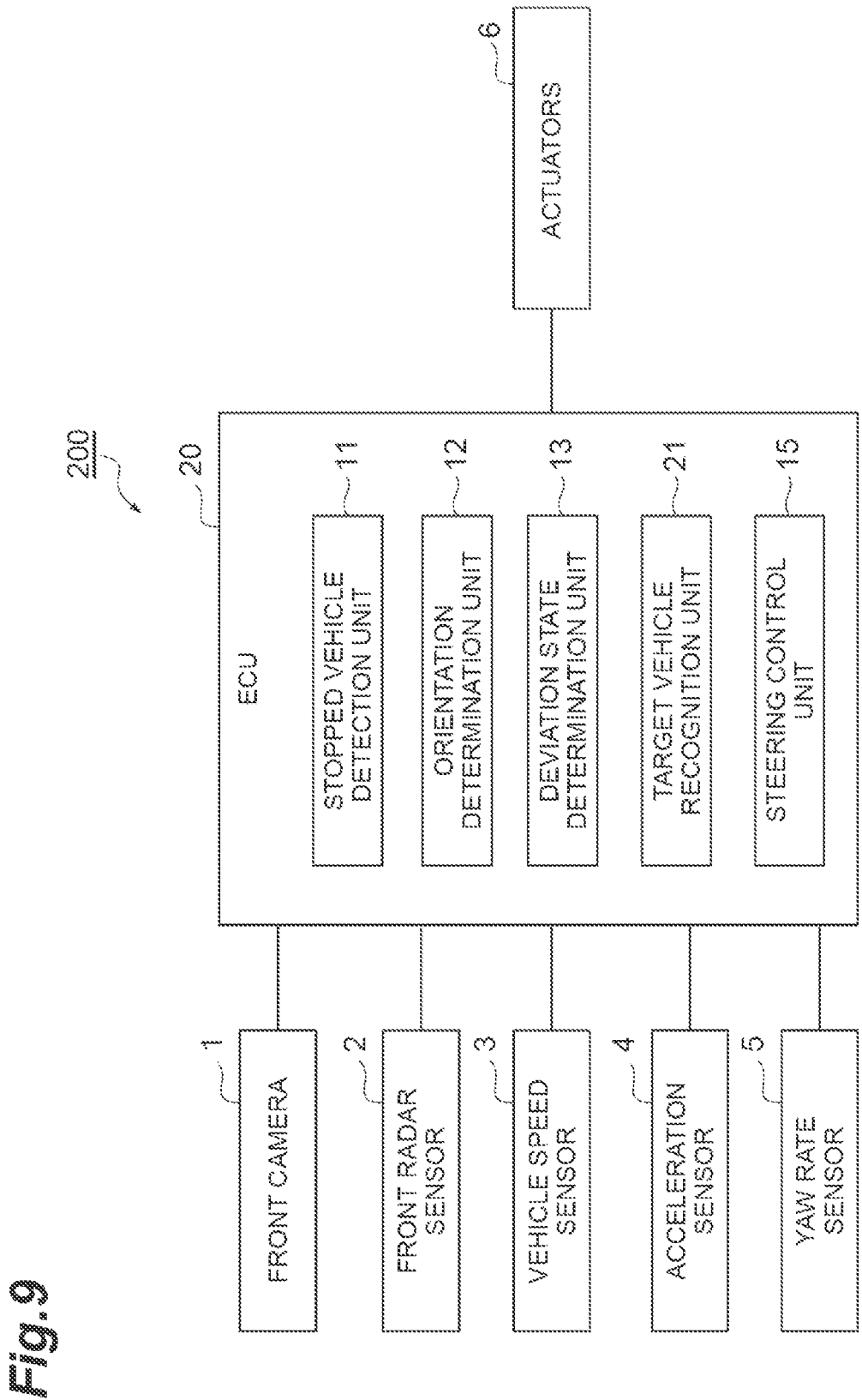

FIG. 9 is a block diagram illustrating a steering control apparatus according to a second embodiment.

FIG. 10A is a diagram illustrating a first example of a case where the vehicle is recognized as a target vehicle in the second embodiment.

FIG. 10B is a diagram illustrating a first example of a case where the vehicle is not recognized as a target vehicle in the second embodiment.

Figure 11B:
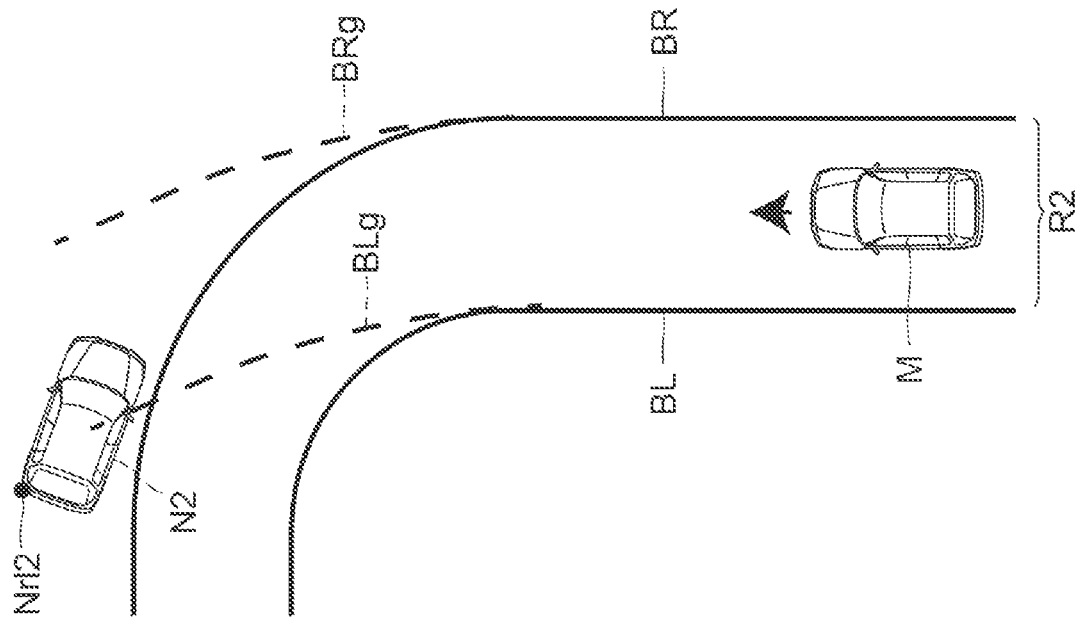
Figure 11A:
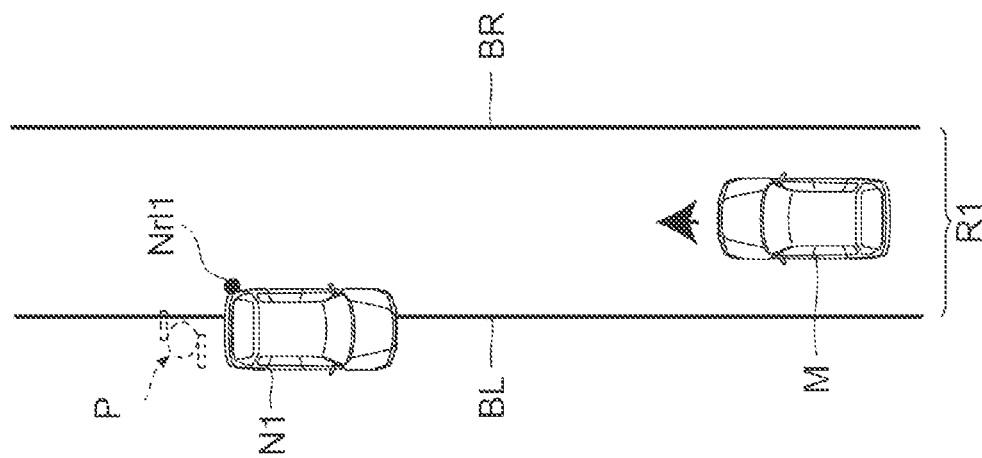

FIG. 11A is a diagram illustrating a second example of a case where the vehicle is recognized as a target vehicle in the second embodiment.

FIG. 11B is a diagram illustrating a second example in which the vehicle is not recognized as a target vehicle in the second embodiment.

Figure 12B:
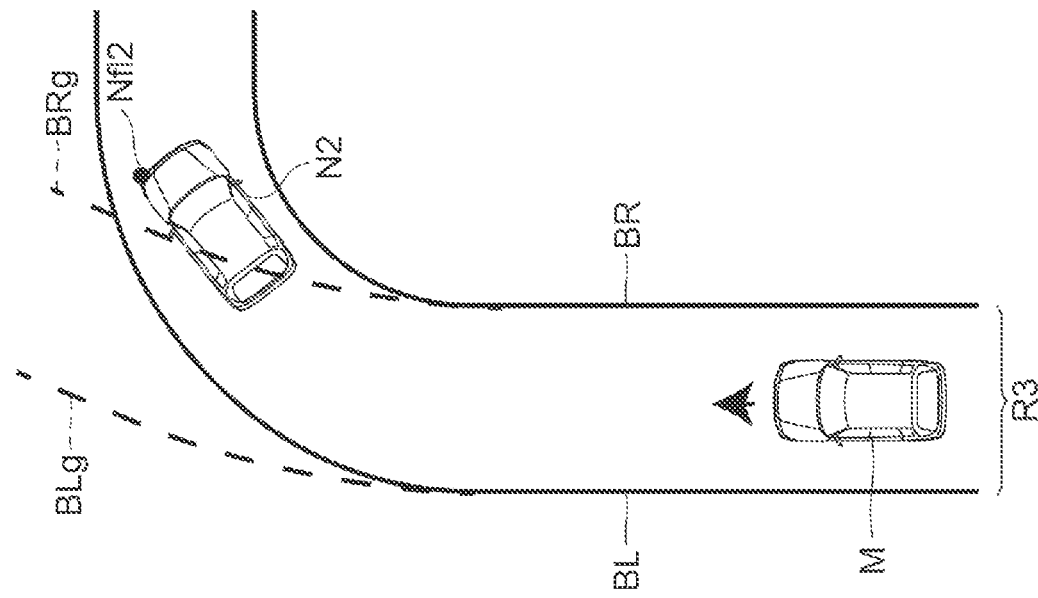
Figure 12A:
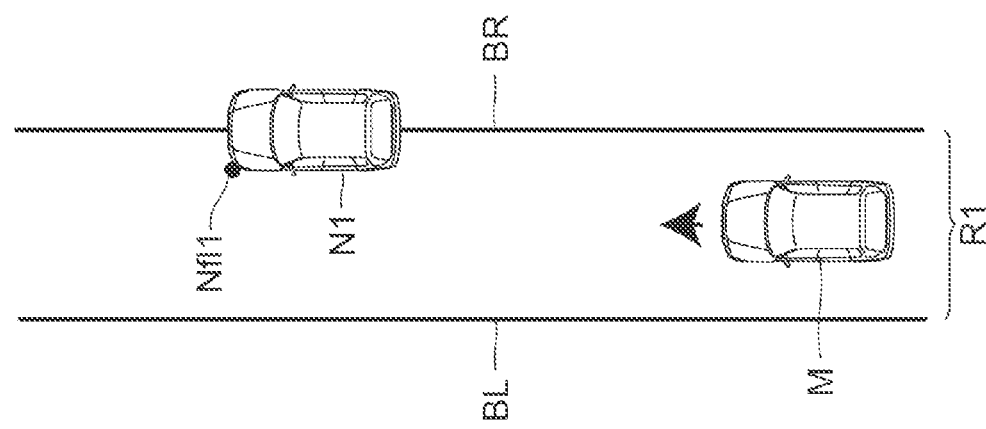

FIG. 12A is a diagram illustrating a third example of a case where the vehicle is recognized as a target vehicle in the second embodiment.

FIG. 12B is a diagram illustrating a third example in a case where the vehicle is not recognized as a target vehicle in the second embodiment.

Figure 13B:
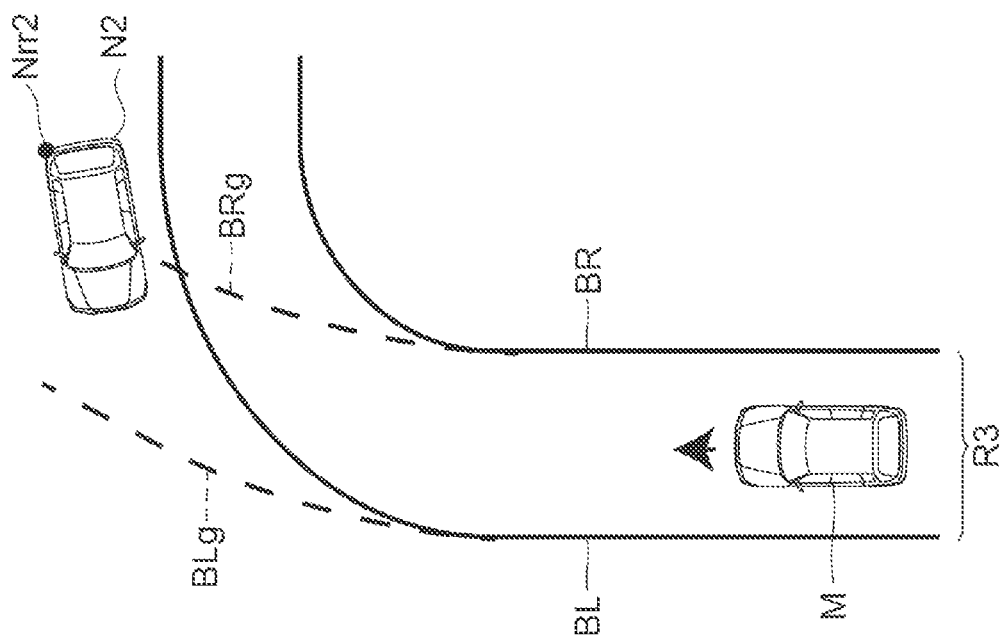
Figure 13A:
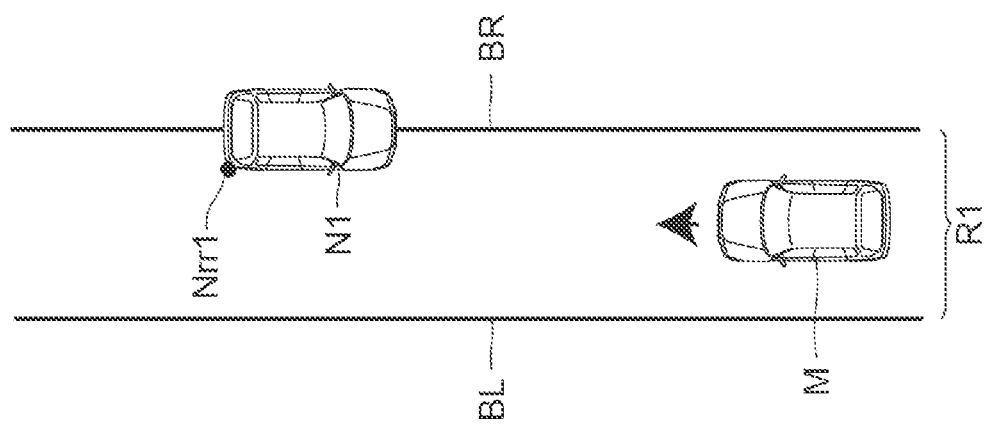

FIG. 13A is a diagram illustrating a fourth example of a case where the vehicle is recognized as a target vehicle in the second embodiment.

FIG. 13B is a diagram illustrating a fourth example of a case where the vehicle is not recognized as a target vehicle in the second embodiment.

Figure 14:
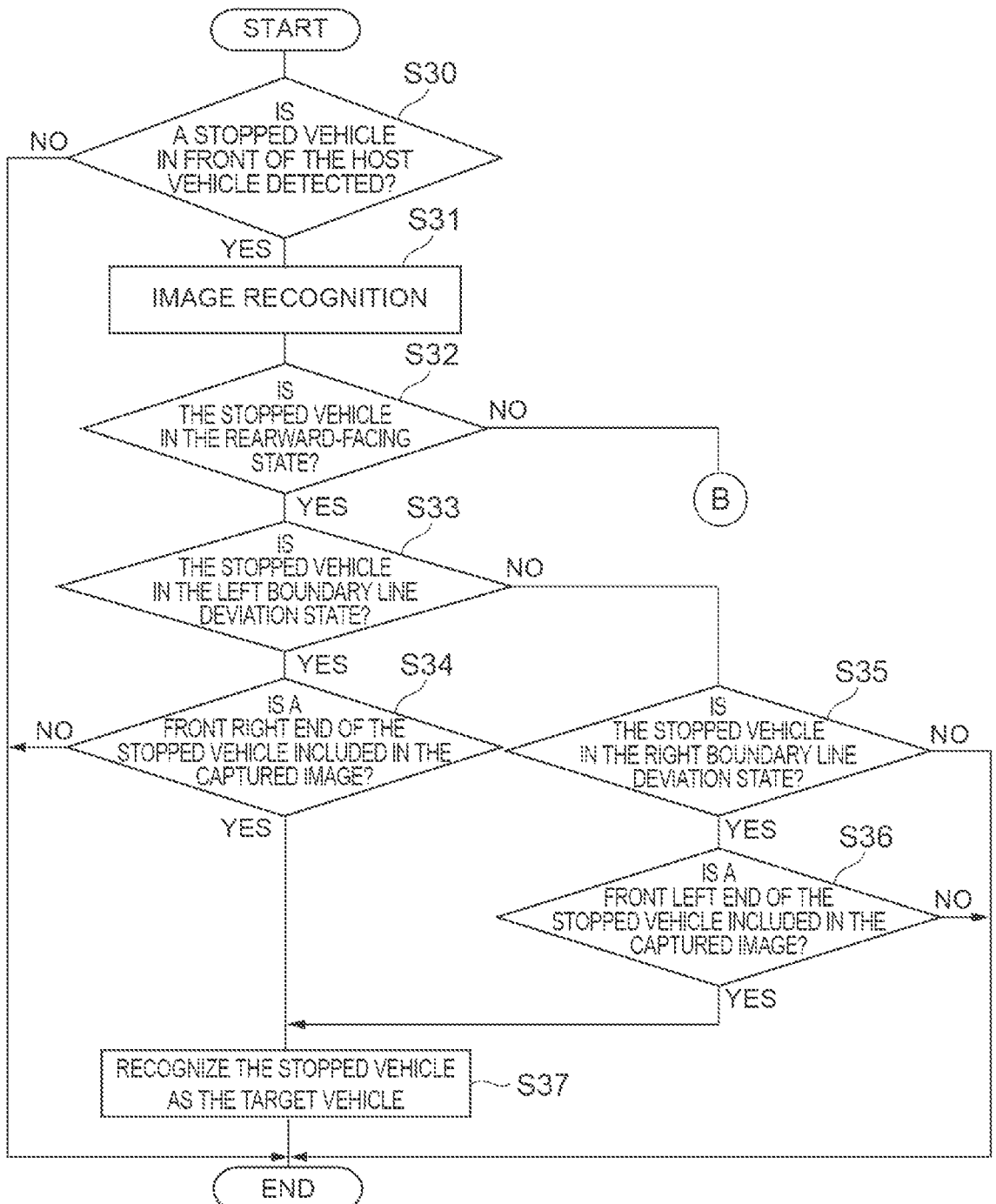

FIG. 14 is a flowchart illustrating an example of target vehicle recognition processing in the second embodiment.

Figure 15:
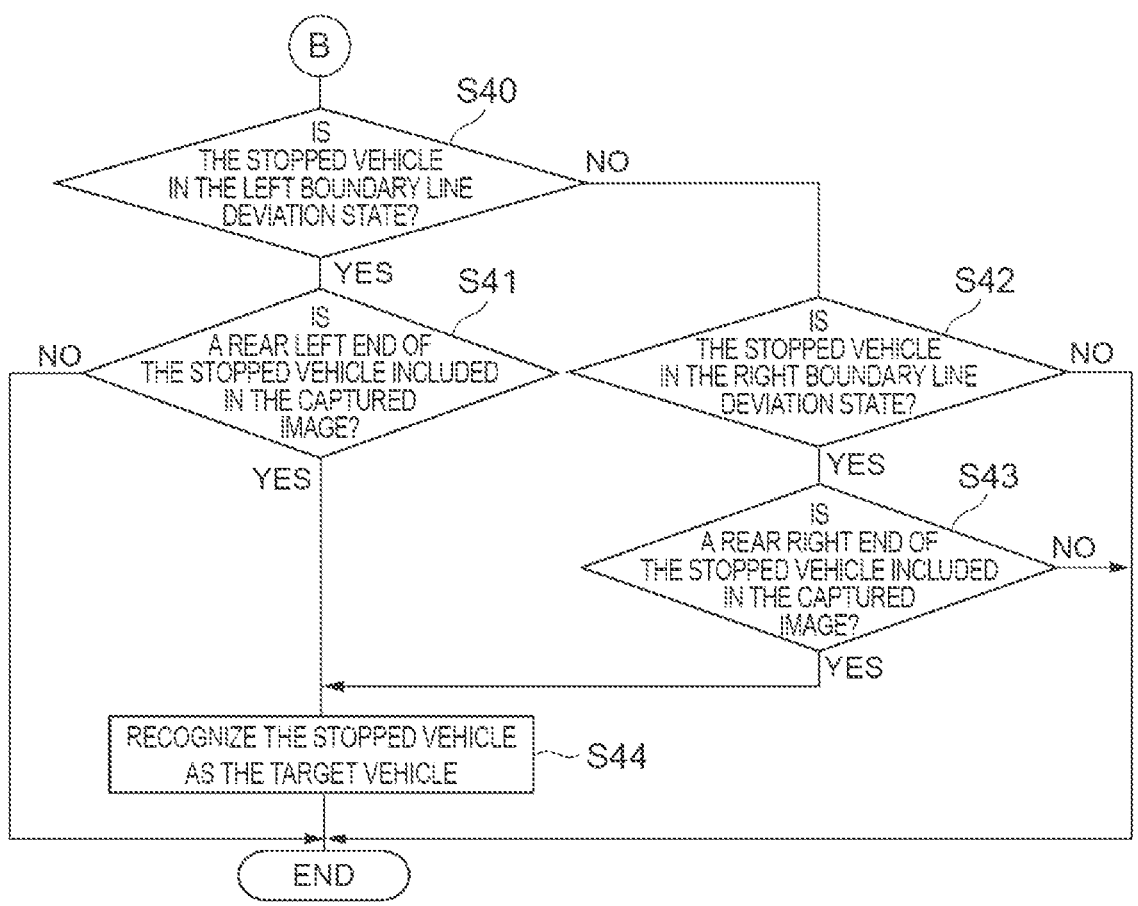

FIG. 15 is a flowchart illustrating a continuation of the target vehicle recognition processing in the second embodiment.

DETAILED DESCRIPTION

Hereinafter, embodiments of the present disclosure will be described with reference to the drawings.

First Embodiment

As illustrated in FIG. 1, a steering control apparatus 100 (target vehicle recognition apparatus) according to an embodiment is a device that is mounted in a vehicle such as a passenger car and performs steering control of the vehicle. Hereinafter, the vehicle equipped with the steering control apparatus 100 is referred to as host vehicle. The host vehicle may be an autonomous driving vehicle.

The steering control means, as an example, control of steering in a PDA [Proactive Driving Assist]. The steering control includes control for avoiding an object to be avoided by steering the host vehicle. The steering control controls steering of the host vehicle such that the host vehicle passes by the side of the vehicle while keeping a distance from a vehicle as an object to be avoided, the vehicle being stopped or parked while protruding into the travel lane of the host vehicle.

A steering control apparatus 100 recognizes a target vehicle which is a target to be avoided by steering control. Here, FIG. 2A is a diagram illustrating a first example in the case where the vehicle is recognized as a target vehicle. FIG. 2A shows a host vehicle M, a travel lane R1 where the host vehicle M travels, two boundary lines BL, BR forming a travel lane R1, and another vehicle N1. In addition, among four corners (four corner portions in plan view) of the other vehicle N1, a front left end Nfl1 which is an end portion on the left side in the front of the other vehicle N1 is illustrated. The travel lane R1 is a straight lane.

The other vehicle N1 in FIG. 2A is vehicle that is stopped (or parked) while protruding into the travel lane R1. For example, the other vehicle N1 straddles the boundary line BL of the travel lane R1 and rides on the sidewalk and parked. In the situation shown in FIG. 2A, there is a possibility that a pedestrian P jumps out from behind the other vehicle N1, which is a blind spot seen from the host vehicle M. The steering control apparatus 100 uses a captured image (see FIG. 3) captured by the front camera of the host vehicle M to recognize the other vehicle N1 located across the boundary line BL as a target vehicle that a target to be avoided by steering control. The recognition of the target vehicle will be described in detail later.

FIG. 2B is a diagram illustrating a first example of a case where the vehicle is not recognized as a target vehicle. FIG. 2B illustrates a travel lane R2 where the host vehicle travels, another vehicle N2, a virtual projection line BLg of the boundary line BL, and a virtual projection line BRg of a boundary line BR. In addition, among four corners (four corner portions in plan view) of the other vehicle N2, a front left end Nfl2 which is an end portion on the left side in the front of the other vehicle N2 is illustrated.

The travel lane R2 is a curve that curves to the left in the travel direction of the host vehicle M. The other vehicle N2 is vehicle turning a curve. Since the accuracy of speed detection decreases as the distance from the host vehicle M increases, although the other vehicle N2 is a vehicle in a state of travelling, the vehicle may be erroneously determined as a stopped vehicle.

The virtual projection line BLg is a line obtained by projecting the boundary line BL on the captured image captured by the front camera of the host vehicle M onto the actual road surface. Similarly, the virtual projection line BRg is a line obtained by projecting the boundary line BR on the captured image captured by the front camera of the host vehicle M onto the actual road surface. That is, in the situation shown in FIG. 2B, the other vehicle N2 turning a curve of a travel lane R2 appears to straddle the boundary line BL in the captured image captured by the front camera of the host vehicle M. In this case, the steering control apparatus 100 uses the fact that the front left end Nfl2 of the other vehicle N2 during turning a curve is not included in the captured image to prevent the other vehicle N2 from being erroneously recognized as the target vehicle which is to target to be avoided by steering control.

Configuration of Steering Control Apparatus According to First Embodiment

The steering control apparatus 100 is provided with an ECU (Electronic Control Unit) 10. The ECU 10 is an electronic control unit including a central processing unit (CPU) and a storage unit such as a read only memory (ROM) or a random-access memory (RAM). In the ECU 10, for example, various functions are realized by executing a program stored in the storage unit by the CPU. The ECU 10 may be composed of a plurality of electronic units. In addition, some of the functions of the ECU 10 described below may be executed in servers capable of communicating with the host vehicle.

A front camera 1, a front radar sensor 2, a vehicle speed sensor 3, an acceleration sensor 4, a yaw rate sensor 5, and actuators 6 are connected to the ECU 10. The front camera 1 is a camera for capturing an image in front of the host vehicle. The front camera 1 is provided on the back side of the windshield of the host vehicle, for example, and transmits the captured image in front of the host vehicle to the ECU 10. The front camera 1 may be a monocular camera or may be a stereo camera.

The front radar sensor 2 is a detection device that detects an object in front of the host vehicle using radio waves (for example, millimeter waves) or light. The front radar sensor 2 includes, for example, a millimeter wave radar or a light detection and ranging [LIDAR]. The front radar sensor 2 detects an object by transmitting radio waves or light to the periphery of the host vehicle and receiving radio waves or light reflected by the object. The front radar sensor 2 transmits information on the detected object such as the preceding vehicle to the ECU 10. The detection result of the front radar sensor 2 also includes speed information of the object (for example, a relative speed with a host vehicle).

The vehicle speed sensor 3 is a detector that detects the speed of the host vehicle. As the vehicle speed sensor 3, for example, a wheel speed sensor that is provided on a wheel of a host vehicle or a drive shaft that rotates integrally with the wheel and detects the rotation speed of the wheel is used. The vehicle speed sensor 3 transmits the detected vehicle speed information (wheel speed information) to the ECU 10.

The acceleration sensor 4 is a detector that detects accelerations of the host vehicle. The acceleration sensor 4 includes, for example, a longitudinal acceleration sensor that detects longitudinal accelerations of the host vehicle, and a lateral acceleration sensor that detects lateral accelerations of the host vehicle. The acceleration sensor 4 transmits, for example, acceleration information of the host vehicle to the ECU 10.

The yaw rate sensor 5 is a detector that detects the yaw rate (rotational angular speed) of the vertical axis of the center of gravity of the host vehicle. As the yaw rate sensor 5, for example, a gyro sensor can be used. The yaw rate sensor 5 transmits yaw rate information of the detected host vehicle to the ECU 10.

The actuator 6 is a device used for controlling the host vehicle. The actuator 6 includes at least a drive actuator, a brake actuator, and a steering actuator. The drive actuator controls the amount of air supplied to the engine (throttle opening) in accordance with a control signal from the ECU 10, and controls the driving force of the host vehicle. When the host vehicle is a hybrid electric vehicle (HEV), a control signal from the ECU 10 is input to a motor as a power source in addition to the amount of air supplied to the engine, and the driving force is controlled. When the host vehicle is a battery electric vehicle (BEV), a control signal from the ECU 10 is input to a motor as a power source, and the driving force is controlled. The motor as a power source in these cases constitutes the actuator 6.

The brake actuator controls a brake system in response to a control signal from the ECU 10, and controls a braking force applied to wheels of the host vehicle. As the brake system, for example, a hydraulic brake system can be used. The steering actuator controls driving of an assist motor for controlling steering torque in an electric power steering system according to a control signal from the ECU 10. Accordingly, the steering actuator controls the steering torque of the host vehicle.

Next, the functional configuration of the ECU 10 will be described. As shown in FIG. 1, the ECU 10 has a stopped vehicle detection unit 11, an orientation determination unit 12, a deviation state determination unit 13, a target vehicle recognition unit 14, and a steering control unit 15. Note that some of the functions of the ECU 10 described below may be executed by servers capable of communicating with the host vehicle.

The stopped vehicle detection unit 11 may detect a stopped vehicle located in front of the host vehicle based on at least one of a captured image of the front camera 1 or a detection result of the front radar sensor 2. The stopped vehicle is a vehicle having a speed of "0". The vehicle is not limited to a four wheeled vehicle and may be a two wheeled vehicle. A method of detecting the stopped vehicle is not particularly limited, and a known method can be adopted. The stopped vehicle detection unit 11 may detect that the vehicle is the stopped vehicle from a speed difference between other vehicles in front of the host vehicle and a guardrail or other structure in front of the host vehicle. The stopped vehicle detection unit 11 may detect the stopped vehicle based on the vehicle speed detected by the vehicle speed sensor 3 of the host vehicle. Note that the stopped vehicle detection unit 11 may erroneously detect a traveling other vehicle as the stopped vehicle due to an error in speed information caused by sensor accuracy or the like with respect to a distant other vehicle.

When the stopped vehicle is detected by the stopped vehicle detection unit 11, an orientation determination unit 12 determines the orientation of the stopped vehicle based on the captured image of the front camera 1 of the host vehicle. The orientation determination unit 12 determines whether the stopped vehicle is in a forward-facing state to the host vehicle or in a rearward-facing state to the host vehicle.

The orientation determination unit 12 determines the direction of the stopped vehicle from the captured image by image recognition such as pattern matching or deep learning. The orientation determination unit 12 may determine the orientation of the stopped vehicle from the captured image by a known image processing technique.

When the stopped vehicle is detected by the stopped vehicle detection unit 11, the deviation state determination unit 13 determines whether the stopped vehicle is in the right boundary line deviation state, whether the stopped vehicle is in the left boundary line deviation state, or whether the stopped vehicle is neither in the right boundary line deviation state nor the left boundary line deviation state. The deviation state determination unit 13 performs the above determination based on the captured image captured by the front camera of the host vehicle. The right boundary line deviation state is a state in which the stopped vehicle straddles the boundary line on the right side of the travel lane of the host vehicle. The left boundary line deviation state is a state in which the stopped vehicle straddles the boundary line on the left side of the travel lane.

As an example, the deviation state determination unit 13 performs the determination by detecting various positions related to the stopped vehicle and the boundary line on the captured image. The deviation state determination unit 13 detects a reference axis, a vehicle left end position, a vehicle right end position, and a reference boundary line position. The reference axis is an axis extending in the image horizontal direction from the lower end of the stopped vehicle on the captured image. The vehicle left end position is a position obtained by projecting the left end of the stopped vehicle on the captured image on the reference axis. The vehicle right end position is a position obtained by projecting the right end of the stopped vehicle on the captured image on the reference axis. The reference boundary line position is a position where at least one of two boundary lines forming the travel lane R1 of the host vehicle intersects with the reference axis line on the captured image.

The deviation state determination unit 13 detects the above-described various positions by recognizing boundary lines of the stopped vehicle and the travel lane on the captured image through deep learning or pattern matching, for example. The deviation state determination unit 13 may detect the above-described various positions by using other well-known image processing methods.

Here, FIG. 3 is a diagram illustrating an example of a captured image corresponding to FIG. 2A. FIG. 3 shows a captured image G in front of the host vehicle M, the travel lane R1 in the captured image G, two the boundary line BL forming the travel lane R1, a stopped vehicle N1, a reference axis CL, a vehicle left end position NL, a vehicle right end position NR, a first reference boundary line position C1, a second reference boundary line position C2, a first distance DA, and a second distance DB in the captured image G.

As shown in FIG. 3, the reference axis CL is an axial line extending horizontally in the image from the lower end of the stopped vehicle N1 on the captured image G. The image horizontal direction is a horizontal direction in the captured image G. The lower end of the stopped vehicle N1 is, for example, the lower end of the tire of the stopped vehicle N1 on the captured image G.

The vehicle left end position NL is a position obtained by projecting the left end of the stopped vehicle N1 onto the reference axis CL on the captured image G. The vehicle right end position NR is a position obtained by projecting the right end of the stopped vehicle N1 on the captured image G onto the reference axis CL. The left end of the stopped vehicle N1 is a portion located at the leftmost end of the stopped vehicle N1. It may be the leftmost protruding portion of the vehicle body of the stopped vehicle N1, or may be the leftmost protruding portion of the loading platform when the stopped vehicle N1 is a cargo vehicle. When the left mirror of the stopped vehicle N1 protrudes to the leftmost side, the tip end of the left mirror may be set as the left end. A position obtained by projecting the left end of the stopped vehicle N1 perpendicularly to the reference axis CL is the vehicle left end position NL. Since the vehicle right end position NR is the same as the vehicle left end position NL, description thereof will be omitted.

The first reference boundary line position C1 is a position where the boundary line BL and the reference axis CL on the captured image G cross each other. The second reference boundary line position C2 is a position where the boundary line BR and the reference axis CL intersect. The first reference boundary line position C1 may be the position of the image horizontal center of the boundary line BL or the position of the end on the host vehicle side or the end on the side opposite to the host vehicle in the image horizontal direction of the boundary line BL when the boundary line BL is composed of a plurality of pixels in the image horizontal direction (when the boundary line BL has a certain size on the captured image G).

The first distance DA is a length from a position on the host vehicle side of the vehicle left end position NL and the vehicle right end position NR on the reference axis CL to the first reference boundary line position C1. The first distance DA in FIG. 3 is distance between the first reference boundary line position C1 and the vehicle right end position NR. The second distance DB is a length from a position on the host vehicle side of the vehicle left end position NL and the vehicle right end position NR on the reference axis CL to the first reference boundary line position C1. The second distance DB in FIG. 3 is distance between a vehicle left end position NL and the first reference boundary line position C1. The deviation state determination unit 13 may calculate a first distance and second distance corresponding to the second reference boundary line position C.

The deviation state determination unit 13 does not necessarily detect the first reference boundary line position C1 of the boundary line BL and the first reference boundary line position C2 of the boundary line BR. The deviation state determination unit 13 may detect only the reference boundary line position C1 corresponding to the boundary line BL close to the stopped vehicle N1 among the boundary line BL and the boundary line BR.

The deviation state determination unit 13 determines whether or not a reference boundary line position (the first reference boundary line position C1 or the second reference boundary line position C2) sandwiched between the vehicle left end position NL and the vehicle right end position NR of the stopped vehicle N1 exists using the detected various positions.

The deviation state determination unit 13 may obtain horizontal coordinates (coordinates in a horizontal direction of the image) of each position at a pixel level by semantic segmentation in the captured image G. For example, when the pixel coordinates of the vehicle left end position NL are subtracted from the pixel coordinates of the first reference boundary line position C1, the difference becomes a negative value when the vehicle left end position NL is located on the left side of the first reference boundary line position C1. When the vehicle left end position NL is located on the right side of the first reference boundary line position C1, the difference is a positive value.

Similarly, when the pixel coordinates of the vehicle right end position NR are subtracted from the pixel coordinates of the first reference boundary line position C1, the difference becomes a negative value when the vehicle right end position NR is located on the left side of the first reference boundary line position C1. When the vehicle right end position NR is located on the right side of the first reference boundary line position C1, the difference is a positive value. When there is a positive sign/negative signs difference between the difference for the vehicle left end position NL and the difference for the vehicle right end position NR, the deviation state determination unit 13 determines that the first reference boundary line position C1 is present in a state being sandwiched between the vehicle left end position NL and the vehicle right end position NR of the stopped vehicle N1.

The same determination applies to the second reference boundary line position C2. In the situation illustrated in FIG. 3, since there is no difference in the positive sign/negative sign between the difference between second reference boundary line position C2 and the vehicle left end position NL and the difference between the second reference boundary line position C2 and the vehicle right end position NR, the deviation state determination unit 13 determines that the second reference boundary line position C2 is not sandwiched between the vehicle left end position NL and the vehicle right end position NR. Note that the method of obtaining the image coordinates of each position is not limited to semantic segmentation, and a known method can be employed.

The deviation state determination unit 13 determines that the stopped vehicle N1 is in the left boundary line deviation state when it is determined that there is the first reference boundary line position C1 sandwiched between the vehicle left end position NL and the vehicle right end position NR of the stopped vehicle N1. Similarly, the deviation state determination unit 13 determines that the stopped vehicle N1 is in the right boundary line deviation state when it is determined that there is the second reference boundary line position C2 sandwiched between the vehicle left end position NL and the vehicle right end position NR of the stopped vehicle N1. The deviation state determination unit 13 determines that the stopped vehicle N1 is neither in the left boundary line deviation state nor in the right boundary line deviation state when there is no reference boundary line position sandwiched between the vehicle left end position NL and the vehicle right end position NR of the stopped vehicle N1.

The deviation state determination unit 13 may determine that the other vehicle N2 is in the left boundary line deviation state when the other vehicle N2 in the curve is located on the virtual projection line BLg (the line obtained by projecting the boundary line BL on the captured image onto an actual road surface) of the boundary line BL as illustrated in FIG. 2B.

The target vehicle recognition unit 14 recognizes the target vehicle for the steering control based on the captured image of the front camera 1 of the host vehicle, the determination result of the orientation determination unit 12, and the determination result of the deviation state determination unit 13, when the stopped vehicle is detected by the stopped vehicle detection unit 11.

If the deviation state determination unit 13 determines that the stopped vehicle is neither in the right boundary line deviation state nor the left boundary line deviation state, the target vehicle recognition unit 14 does not recognize the stopped vehicle as the target vehicle for the steering control. In other words, the target vehicle recognition unit 14 does not recognize vehicles that are not stopped across the boundary line BL or the boundary line BR as target vehicles.

If the orientation determination unit 12 determines that the stopped vehicle is in the rearward-facing state and the deviation state determination unit 13 determines that the stopped vehicle is in the left boundary line deviation state, the target vehicle recognition unit 14 recognizes the stopped vehicle as the target vehicle for the steering control when the front left end of the stopped vehicle is not included in the captured image.

The front left end is a front left end portion of four corners (four corner portions in a plan view) of the stopped vehicle. The rest are front right end, rear left end, and rear right end. The target vehicle recognition unit 14 determines whether the front left end of the stopped vehicle is included in the captured image by image recognition of the captured image based on the direction of the stopped vehicle determined by the orientation determination unit 12. The same applies to the case of determining front right end, rear left end, and rear right end.

To be more specific, in the situation shown in FIG. 2A, the stopped vehicle N1 is determined to be in the rearward-facing state and the left boundary line deviation state. In this case, the target vehicle recognition unit 14 determines whether the front left end Nfl1 of the stopped vehicle N1 is included in the captured image G. The target vehicle recognition unit 14 recognizes the stopped vehicle N1 as the target vehicle because the front left end Nfl1 of the stopped vehicle N1 is not included in the captured image G viewed from the host vehicle M in the situation shown in FIG. 2A.

On the other hand, when the front left end of the stopped vehicle is included in the captured image, the target vehicle recognition unit 14 does not recognize the stopped vehicle as the target vehicle for the steering control. To be more specific, it is assumed that the other vehicle N2 is determined as the stopped vehicle by the stopped vehicle detection unit 11 due to the speed information error in the situation shown in FIG. 2B. Hereinafter, the other vehicle N2 during traveling on a curve will be described as a stopped vehicle N2.

In the situation illustrated in FIG. 2B, since the stopped vehicle N2 in the curve is located on the virtual projection line BLg of the boundary line BL (the line obtained by projecting the boundary line BL on the captured image onto the actual road surface), it is determined that the stopped vehicle N2 is in the rearward-facing state and the left boundary line deviation state. In this case, the target vehicle recognition unit 14 determines whether the front left end Nfl2 of the stopped vehicle N2 is included in the captured image G. The target vehicle recognition unit 14 does not recognize the stopped vehicle N2 as the target vehicle because the front left end Nfl2 of the stopped vehicle N2 is not included in the captured image G viewed from the host vehicle M in the situation shown in FIG. 2B.

FIG. 4A is a diagram illustrating a second example of the case where the vehicle is recognized as the target vehicle. FIG. 4A is different from FIG. 2A in that the stopped vehicle N1 is in the forward-facing state in which the front face is directed toward the host vehicle M. FIG. 4A shows the rear right end Nrr1 of the stopped vehicle N1.

In the situation shown in FIG. 4A, the stopped vehicle N1 is determined to be in the forward-facing state and the left boundary line deviation state. In this case, the target vehicle recognition unit 14 determines whether or not the rear right end Nrr1 of the stopped vehicle N1 is included in the captured image G. The target vehicle recognition unit 14 recognizes the stopped vehicle N1 as the target vehicle because the rear right end Nrr1 of the stopped vehicle N1 is included in the captured image G viewed from the host vehicle M in the situation shown in FIG. 4A.

FIG. 4B is a diagram illustrating a second example of a case where the vehicle is not recognized as the target vehicle. In FIG. 4B, the stopped vehicle N2 runs on the outside of the travel lane R2 (for example, an opposite lane), and is different from FIG. 2B in that it is in the forward-facing state in which the front face faces the host vehicle M. FIG. 4B shows the rear right end Nrr2 of the stopped vehicle N2.

In the situation shown in FIG. 4B, since the stopped vehicle N2 is located above the virtual projection line BLg of the boundary line BL, it is determined that the stopped vehicle N2 is in the forward-facing state and the left boundary line deviation state. The virtual projection line BLg is a line obtained by projecting the boundary line BL on the captured image onto an actual road surface. In this case, the target vehicle recognition unit 14 determines whether or not the rear right end Nrr2 of the stopped vehicle N2 is included in the captured image G. The target vehicle recognition unit 14 does not recognize the stopped vehicle N2 as the target vehicle because the rear right end Nrr2 of the stopped vehicle N2 is included in the captured image G viewed from the host vehicle M in the situation shown in FIG. 4B.

FIG. 5A is a diagram illustrating a third example in the case where the vehicle is recognized as the target vehicle. FIG. 5A is different from FIG. 2A in that the stopped vehicle N1 is a right boundary line deviation state located on the right side of the host vehicle M. FIG. 5A shows a front right end Nfr1 of the stopped vehicle N1.

In the situation shown in FIG. 5A, the stopped vehicle N1 is determined to be in the rearward-facing state and the right boundary line deviation state. In this case, the target vehicle recognition unit 14 determines whether or not the front right end Nfr1 of the stopped vehicle N1 is included in the captured image G. The target vehicle recognition unit 14 recognizes the stopped vehicle N1 as the target vehicle because the front right end Nfr1 of the stopped vehicle N1 is not included in the captured image G viewed from the host vehicle M in the situation shown in FIG. 5A.

FIG. 5B is a diagram illustrating a third example in which the vehicle is not recognized as the target vehicle. In FIG. 5B, the host vehicle M and the stopped vehicle N2 are different from those in FIG. 2B in that they travel in the travel lane R3 turning to the right side. FIG. 5B shows the front right end Nfr2 of the stopped vehicle N2.

In the situation shown in FIG. 5B, since the stopped vehicle N2 in the curve is located above the virtual projection line BRg of the boundary line BR, it is determined that the stopped vehicle N2 is in the rearward-facing state and the right boundary line deviation state. The virtual projection line BRg is a line obtained by projecting the boundary line BR on the captured image onto an actual road surface. In this case, the target vehicle recognition unit 14 determines whether or not the front right end Nfr2 of the stopped vehicle N2 is included in the captured image G. The target vehicle recognition unit 14 does not recognize the stopped vehicle N2 as the target vehicle because the front right end Nfr2 of the stopped vehicle N2 is included in the captured image G viewed from the host vehicle M in the situation shown in FIG. 5B.

FIG. 6A is a diagram illustrating a fourth example of the case where the vehicle is recognized as the target vehicle. FIG. 6A is different from FIG. 2A in that the stopped vehicle N1 is a forward-facing state to the host vehicle M and is the right boundary line deviation state located on the right side of the host vehicle M. FIG. 6A shows the rear left end Nfl1 of the stopped vehicle N1.

In the situation shown in FIG. 6A, the stopped vehicle N1 is determined to be in the forward-facing state and the right boundary line deviation state. In this case, the target vehicle recognition unit 14 determines whether or not the rear left end Nfl1 of the stopped vehicle N1 is included in the captured image G. The target vehicle recognition unit 14 recognizes the stopped vehicle N1 as the target vehicle because the rear left end Nfl1 of the stopped vehicle N1 is not included in the captured image G viewed from the host vehicle M in FIG. 6A.

FIG. 6B is a diagram illustrating a fourth example in which the vehicle is not recognized as the target vehicle. In FIG. 6B, the host vehicle M travels in the travel lane R3 turning to the right side, and the stopped vehicle N2 travels outside the travel lane R2 (on another road or the like) and is in the forward-facing state to the host vehicle M, which is different from FIG. 2B. FIG. 6B shows the rear left end Nrl2 of the stopped vehicle N2.

In the situation shown in FIG. 6B, since the stopped vehicle N2 is located on the virtual projection line BRg of the boundary line BR (line obtained by projecting the boundary line BR on the captured image onto the actual road surface), it is determined that the stopped vehicle N2 is in the forward-facing state and the right boundary line deviation state. In this case, the target vehicle recognition unit 14 determines whether the rear left end Nrl2 of the stopped vehicle N2 is included in the captured image G. The target vehicle recognition unit 14 does not recognize the stopped vehicle N2 as the target vehicle because the rear left end Nrl2 of the stopped vehicle N2 is included in the captured image G viewed from the host vehicle M in the situation shown in FIG. 6B.

Even when the end portion of the stopped vehicle N1 used for the determination is not included in the captured image G, the target vehicle recognition unit 14 may not recognize the stopped vehicle N1 as the target vehicle when the first distance DA illustrated in FIG. 3 is larger than the second distance DB. That is, when most of the stopped vehicle N1 is located on the travel lane R1 of the host vehicle, there is a high possibility that the preceding vehicle of the host vehicle is in a momentary stop. For this reason, the target vehicle recognition unit 14 does not recognize the stopped vehicle N1 as the target vehicle for the steering control when the first distance DA on the host vehicle side is larger than the second distance DB on the reference axis CL, and thus it is possible to avoid erroneously setting the preceding vehicle of the dynamically stopping host vehicle as the avoidance target of the steering control.

When the target vehicle, which is a target to be avoided by the steering control, is recognized by the target vehicle recognition unit 14, the steering control unit 15 performs the steering control to avoid the target vehicle and pass by the side of the target vehicle. The steering control unit 15 performs steering control based on the vehicle speed, the accelerations, and the yaw rate of the host vehicle based on the captured image of the front camera 1 and/or the detection result of the front radar sensor 2. Note that the steering control unit 15 does not necessarily perform steering control even when the target vehicle is recognized.

Processing Method of Steering Control Apparatus According to First Embodiment

Next, a processing method of the steering control apparatus 100 (target vehicle recognition apparatus) according to the present embodiment will be described. FIG. 7 is a flowchart illustrating an example of the target vehicle recognition processing. FIG. 8 is a flowchart illustrating the continuation of the target vehicle recognition processing. The target vehicle recognition processing is performed, for example, when a setting regarding necessity of execution of steering control of the host vehicle by the driver is set to necessary.

As shown in FIG. 7, the ECU 10 of the steering control apparatus 100 detects the stopped vehicle N1 located in front of the host vehicle by the stopped vehicle detection unit 11 as S10. S10 is a stopped vehicle detection step. The stopped vehicle detection unit 11 detects the stopped vehicle N1 based on at least one of the captured image of the front camera 1 or the detection result of the front radar sensor 2.

In S11, the ECU 10 performs image recognition of the captured image by the orientation determination unit 12 and the deviation state determination unit 13. S11 is an image recognition step. The orientation determination unit 12 performs image recognition of a captured image by deep learning or pattern matching, for example. Similarly, the deviation state determination unit 13 detects various positions related to the stopped vehicle and the boundary line on the captured image by image recognition.

In S12, the ECU 10 determines whether the stopped vehicle is in the forward-facing state or the rearward-facing state according to the orientation determination unit 12. S12 is an orientation determination step. The ECU 10 shifts to S13 if the stopped vehicle is determined to be in a rearward-facing state (YES in S12). When it is determined that the stopped vehicle is not in the rearward-facing state (No in S12), the ECU 10 proceeds to S20 of FIG. 8.

In S13, the ECU 10 determines whether the stopped vehicle is in the left boundary line deviation state by the deviation state determination unit 13. S13 is a first boundary line deviation state determination step. If it is determined that the stopped vehicle is in the left boundary line deviation state (YES in S13), the ECU 10 shifts to S14. If it is determined that the stopped vehicle is not in the left boundary line deviation state (NO in S13), the ECU 10 shifts to S15.

In S14, the ECU 10 determines whether the front left end of the stopped vehicle is included in the captured image by the target vehicle recognition unit 14. S14 is a front left end determination step. If it is determined that the front left end of the stopped vehicle is included in the captured image (YES in S14), the ECU 10 shifts to S17. When it is determined that the front left end of the stopped vehicle is not included in the captured image (NO in S14), the ECU 10 ends the target vehicle recognition processing without recognizing the stopped vehicle as the target vehicle.

In S15, the ECU 10 determines whether the stopped vehicle is in the right boundary line deviation state by the deviation state determination unit 13. S15 is a second boundary line deviation state determination step. If it is determined that the stopped vehicle is in the right boundary line deviation state (YES in S15), the ECU 10 shifts to S16. If it is not determined that the stopped vehicle is in the right boundary line deviation state (NO in S15), the ECU 10 determines that the stopped vehicle is neither in the left boundary line deviation state nor in the right boundary line deviation state, and ends the target vehicle recognition processing without recognizing the stopped vehicle as the target vehicle.

In S16, the ECU 10 determines whether the front right end of the stopped vehicle is included in the captured image by the target vehicle recognition unit 14. S16 is a front right end determination step. If it is determined that the front right end of the stopped vehicle is included in the captured image (YES in S16), the ECU 10 shifts to S17. When it is determined that the front right end of the stopped vehicle is not included in the captured image (NO in S16), the ECU 10 ends the target vehicle recognition processing without recognizing the stopped vehicle as the target vehicle.

In S17, the ECU 10 recognizes the stopped vehicle as the target vehicle which is an avoidance target of steering control according to the target vehicle recognition unit 14. S17 is a target vehicle recognition step. Thereafter, the ECU 10 ends the target vehicle recognition processing.

As shown in FIG. 8, the ECU 10 determines whether the stopped vehicle is in the left boundary line deviation state by the deviation state determination unit 13 as S20. S20 is a third boundary line deviation state determination step. If it is determined that the stopped vehicle is in the left boundary line deviation state (YES in S20), the ECU 10 shifts to S21. If it is not determined that the stopped vehicle is in the left boundary line deviation state (NO in S20), the ECU 10 shifts to S22.

In S21, the ECU 10 determines whether the rear right edge of the stopped vehicle is included in the captured image by the target vehicle recognition unit 14. S21 is a rear right end determination step. If it is determined that the rear right edge of the stopped vehicle is included in the captured image (YES in S21), the ECU 10 shifts to S24. If it is not determined that the rear right end of the stopped vehicle is included in the captured image (NO in S21), the ECU 10 ends the target vehicle recognition processing without recognizing the stopped vehicle as the target vehicle.

In S22, the ECU 10 determines whether the stopped vehicle is in the right boundary line deviation state by the deviation state determination unit 13. S22 is a fourth boundary line deviation state determination step. If it is determined that the stopped vehicle is in the right boundary line deviation state (YES in S22), the ECU 10 shifts to S23. If it is not determined that the stopped vehicle is in the right boundary line deviation state (NO in S22), the ECU 10 determines that the stopped vehicle is neither in the left boundary line deviation state nor in the right boundary line deviation state, and ends the target vehicle recognition processing without recognizing the stopped vehicle as the target vehicle.

In S23, the ECU 10 determines whether the rear left edge of the stopped vehicle is included in the captured image by the target vehicle recognition unit 14. S23 is a rear left edge determination step. If it is determined that the rear left edge of the stopped vehicle is included in the captured image (YES in S23), the ECU 10 shifts to S24. If it is not determined that the rear left end of the stopped vehicle is included in the captured image (NO in S23), the ECU 10 ends the target vehicle recognition processing without recognizing the stopped vehicle as the target vehicle.

In S24, the ECU 10 recognizes the stopped vehicle as the target vehicle which is a target to be avoided by steering control according to the target vehicle recognition unit 14. Thereafter, the ECU 10 ends the target vehicle recognition processing.

With the steering control apparatus 100 according to the first embodiment described above, it is possible to appropriately recognize the target vehicle that is a target to be avoided by steering control based on the captured image. That is, in an apparatus of related art, when the preceding vehicle or the oncoming vehicle of the host vehicle is turning a curve, if the preceding vehicle or the oncoming vehicle is erroneously determined as the stopped vehicle and the preceding vehicle or the oncoming vehicle is determined as the left boundary line deviation state or the right boundary line deviation state based on the captured image of the front camera of the host vehicle, the preceding vehicle or the oncoming vehicle turning the curve may be erroneously recognized as the target vehicle for steering control. On the other hand, the steering control apparatus 100 determines whether there is an end portion that is not included in the captured image among the end portions of the four corners of the preceding vehicle or the oncoming vehicle turning the curve. This prevents the preceding vehicle or the oncoming vehicle turning the curve from being erroneously recognized as the target vehicle for the steering control and allows the target vehicle to be appropriately recognized from the captured image.

Second Embodiment

Next, a steering control apparatus (target vehicle recognition apparatus) according to a second embodiment will be described with reference to the drawings. FIG. 9 is a block diagram illustrating the steering control apparatus according to the second embodiment.

Configuration of Steering Control Apparatus According to Second Embodiment

The steering control apparatus 200 according to the second embodiment shown in FIG. 9 is different from the first embodiment only in the function of the target vehicle recognition unit 21 in ECU 20. The target vehicle recognition unit 21 according to the second embodiment recognizes the target vehicle by focusing not on an end portion that is not included in the captured image if the vehicle is the target vehicle among the four corners of the stopped vehicle but on an end portion that is included in the captured image if the vehicle is the target vehicle.

That is, if the stopped vehicle is determined to be in a rearward facing state and the stopped vehicle is determined to be in a left boundary line deviation state, if the front right end of the stopped vehicle is included in a captured image, the target vehicle recognition unit 21 recognizes a stopped vehicle as a target vehicle for steering control.

FIG. 10A is a diagram illustrating a first example of a case where the vehicle is recognized as a target vehicle in the second embodiment. In the situation of FIG. 10A, the stopped vehicle N1 is determined to be in the rearward-facing state and the left boundary line deviation state. In this case, the target vehicle recognition unit 21 determines whether the front right end Nfr1 of the stopped vehicle N1 is included in the captured image G. Since the front right end Nfr1 of the stopped vehicle N1 is included in the captured image G viewed from the host vehicle M in the situation of FIG. 10A, the target vehicle recognition unit 21 recognizes the stopped vehicle N1 as the target vehicle.

On the other hand, when the front right end of the stopped vehicle is not included in the captured image, the target vehicle recognition unit 21 does not recognize the stopped vehicle as the target vehicle for the steering control. FIG. 10B is a diagram illustrating a first example in a case where the vehicle is not recognized as the target vehicle in the second embodiment. In the situation shown in FIG. 10B, it is assumed that the other vehicle N2 is determined as the stopped vehicle by the stopped vehicle detection unit 11 due to the speed information error.

In the situation shown in FIG. 10B, since the stopped vehicle N2 in the curve is located above the virtual projection line BLg of the boundary line BL, it is determined that the stopped vehicle N2 is in the rearward-facing state and the left boundary line deviation state. The virtual projection line BLg is a line obtained by projecting the boundary line BL on the captured image onto an actual road surface. In this case, the target vehicle recognition unit 21 determines whether the front right end Nfr2 of the stopped vehicle N2 is included in the captured image G. The target vehicle recognition unit 21 does not recognize the stopped vehicle N2 as the target vehicle because the front right end Nfr2 of the stopped vehicle N2 is not included in the captured image G viewed from the host vehicle M in the situation shown in FIG. 10B.

FIG. 11A is a diagram illustrating a second example of a case where the vehicle is recognized as the target vehicle in the second embodiment. FIG. 11A is different from FIG. 10A in that the stopped vehicle N1 is in the forward-facing state in which the front face is directed toward the host vehicle M.

In the situation shown in FIG. 11A, the stopped vehicle N1 is determined to be in the forward-facing state and the left boundary line deviation state. In this case, the target vehicle recognition unit 21 determines whether the rear left end Nrl1 of the stopped vehicle N1 is included in the captured image G. The target vehicle recognition unit 21 recognizes the stopped vehicle N1 as the target vehicle because the rear left end Nrl1 of the stopped vehicle N1 is included in the captured image G viewed from the host vehicle M in the situation shown in FIG. 11A.

FIG. 11B is a diagram illustrating a second example in which the vehicle is not recognized as the target vehicle in the second embodiment. In FIG. 11B, the stopped vehicle N2 runs on the outside of the travel lane R2 (for example, an opposite lane), and is different from FIG. 10B in that it is in the forward-facing state in which the front face faces the host vehicle M.

In the situation shown in FIG. 11B, since the stopped vehicle N2 is located above the virtual projection line BLg of the boundary line BL, it is determined that the stopped vehicle N2 is in the forward-facing state and the left boundary line deviation state. The virtual projection line BLg is a line obtained by projecting the boundary line BL on the captured image onto an actual road surface. In this case, the target vehicle recognition unit 21 determines whether the rear left end Nrl2 of the stopped vehicle N2 is included in the captured image G. The target vehicle recognition unit 21 does not recognize the stopped vehicle N2 as the target vehicle because the rear left end Nrl2 of the stopped vehicle N2 is not included in the captured image G viewed from the host vehicle M in the situation shown in FIG. 11B.

FIG. 12A is a diagram illustrating a third example of a case where the vehicle is recognized as the target vehicle in the second embodiment. FIG. 12A is different from FIG. 10A in that the stopped vehicle N1 is the right boundary line deviation state located on the right side of the host vehicle M.

In the situation shown in FIG. 12A, the stopped vehicle N1 is determined to be in the rearward-facing state and the right boundary line deviation state. In this case, the target vehicle recognition unit 21 determines whether or not the front left end Nfl1 of the stopped vehicle N1 is included in the captured image G. The target vehicle recognition unit 21 recognizes the stopped vehicle N1 as the target vehicle because the front left end Nfl1 of the stopped vehicle N1 is included in the captured image G viewed from the host vehicle M in the situation shown in FIG. 12A.

FIG. 12B is a diagram illustrating a third example in a case where the vehicle is not recognized as the target vehicle in the second embodiment. In FIG. 12B, the host vehicle M and the stopped vehicle N2 are different from those in FIG. 10B in that they travel in the travel lane R3 turning to the right side.

In the situation illustrated in FIG. 12B, since the stopped vehicle N2 in the curve is located on the virtual projection line BRg of the boundary line BR (a line obtained by projecting the boundary line BR on the captured image onto the actual road surface), it is determined that the stopped vehicle N2 is in the rearward-facing state and the right boundary line deviation state. In this case, the target vehicle recognition unit 21 determines whether or not the front left end Nfl2 of the stopped vehicle N2 is included in the captured image G. The target vehicle recognition unit 21 does not recognize the stopped vehicle N2 as the target vehicle because the front left end Nfl2 of the stopped vehicle N2 is not included in the captured image G viewed from the host vehicle M in the situation shown in FIG. 12B.

FIG. 13A is a diagram illustrating a fourth example of a case where the vehicle is recognized as the target vehicle in the second embodiment. FIG. 13A is different from FIG. 10A in that the stopped vehicle N1 is the forward-facing state to the host vehicle M and is the right boundary line deviation state located on the right side of the host vehicle M.

In the situation shown in FIG. 13A, the stopped vehicle N1 is determined to be in the forward-facing state and the right boundary line deviation state. In this case, the target vehicle recognition unit 21 determines whether the rear right end Nrr1 of the stopped vehicle N1 is included in the captured image G. The target vehicle recognition unit 21 recognizes the stopped vehicle N1 as the target vehicle because the rear right end Nrr1 of the stopped vehicle N1 is included in the captured image G viewed from the host vehicle M in the situation shown in FIG. 13A.

FIG. 13B is a diagram illustrating a fourth example of a case where the vehicle is not recognized as the target vehicle in the second embodiment. In FIG. 13B, the host vehicle M travels in the travel lane R3 turning to the right side, and the stopped vehicle N2 travels outside the travel lane R2 (on another road or the like) and is in the forward-facing state to the host vehicle M, which is different from FIG. 10B.

In the situation shown in FIG. 13B, since the stopped vehicle N2 is located above the virtual projection line BRg of the boundary line BR, it is determined that the stopped vehicle N2 is in the forward-facing state and the right boundary line deviation state. The virtual projection line BRg is a line obtained by projecting the boundary line BR on the captured image onto an actual road surface. In this case, the target vehicle recognition unit 21 determines whether or not the rear right end Nrr2 of the stopped vehicle N2 is included in the captured image G. The target vehicle recognition unit 21 does not recognize the stopped vehicle N2 as the target vehicle because the rear right end Nrr2 of the stopped vehicle N2 is not included in the captured image G viewed from the host vehicle M in the situation shown in FIG. 13B.

Processing Method of Steering Control Apparatus According to Second Embodiment

Next, a processing method of the steering control apparatus 200 (target vehicle recognition apparatus) according to the second embodiment will be described. FIG. 14 is a flowchart illustrating an example of target vehicle recognition processing in the second embodiment. FIG. 15 is a flowchart illustrating a continuation of the target vehicle recognition processing in the second embodiment. The target vehicle recognition processing is performed, for example, when steering control of the host vehicle by the driver is set to be executed.

As shown in FIG. 14, the ECU 20 of the steering control apparatus 200 detects the stopped vehicle N1 located in front of the host vehicle by the stopped vehicle detection unit 11 as S30. S30 is a stopped vehicle detection step. The stopped vehicle detection unit 11 detects the stopped vehicle N1 based on the captured image of the front camera 1 and the detection result of the front radar sensor 2.

In S31, the ECU 20 performs image recognition of the captured image by the orientation determination unit 12 and the deviation state determination unit 13. S31 is an image recognition step. The orientation determination unit 12 performs image recognition of a captured image by deep learning or pattern matching, for example. Similarly, the deviation state determination unit 13 detects various positions related to the stopped vehicle and the boundary line on the captured image by image recognition.

In S32, the ECU 20 determines whether the stopped vehicle is in the forward-facing state or the rearward-facing state according to the orientation determination unit 12. S32 is an orientation determination step. If the stopped vehicle is determined to be in the rearward-facing state (YES in S32), the ECU 20 shifts to S33. If it is determined that the stopped vehicle is not in the rearward-facing state (NO in S32), the ECU 20 proceeds to S40 of FIG. 15.

In S33, the ECU 20 determines whether the stopped vehicle is in the left boundary line deviation state by the deviation state determination unit 13. S33 is a first boundary line deviation state determination step. If it is determined that the stopped vehicle is in the left boundary line deviation state (YES in S33), the ECU 20 proceeds to S34. If it is not determined that the stopped vehicle is in the left boundary line deviation state (NO in S33), the ECU 20 shifts to S35.

In S34, the ECU 20 determines whether the front right end of the stopped vehicle is included in the captured image by the target vehicle recognition unit 21. S34 is a front right end determination step. If it is determined that the front right end of the stopped vehicle is included in the captured image (YES in S34), the ECU 20 shifts to S37. If it is determined that the front right end of the stopped vehicle is not included in the captured image (NO in S34), the ECU 20 ends the target vehicle recognition processing without recognizing the stopped vehicle as the target vehicle.

In S35, the ECU 20 determines whether the stopped vehicle is in the right boundary line deviation state by the deviation state determination unit 13. S35 is a second boundary line deviation state determination step. If it is determined that the stopped vehicle is in the right boundary line deviation state (YES in S35), the ECU 20 proceeds to S36. If it is not determined that the stopped vehicle is in the right boundary line deviation state (NO in S35), the ECU 20 determines that the stopped vehicle is neither in the left boundary line deviation state nor in the right boundary line deviation state, and ends the target vehicle recognition processing without recognizing the stopped vehicle as the target vehicle.

In S36, the ECU 20 determines whether the front left end of the stopped vehicle is included in the captured image by the target vehicle recognition unit 21. S36 is a front left end determination step. If it is determined that the front left end of the stopped vehicle is included in the captured image (YES in S36), the ECU 20 shifts to S37. If it is determined that the front left end of the stopped vehicle is not included in the captured image (NO in S36), the ECU 20 ends the target vehicle recognition processing without recognizing the stopped vehicle as the target vehicle.

In S37, the ECU 20 recognizes the stopped vehicle as the target vehicle which is a target to be avoided by steering control according to the target vehicle recognition unit 21. S37 is a target vehicle recognition step. Thereafter, the ECU 20 ends the target vehicle recognition processing.

As shown in FIG. 8, the ECU 20 determines whether the stopped vehicle is in the left boundary line deviation state by the deviation state determination unit 13 as S40. S40 is a third boundary line deviation state determination step. If it is determined that the stopped vehicle is in the left boundary line deviation state (YES in S40), the ECU 20 shifts to S41. If it is not determined that the stopped vehicle is in the left boundary line deviation state (NO in S40), the ECU 20 shifts to S42.

In S41, the ECU 20 determines whether the rear left edge of the stopped vehicle is included in the captured image by the target vehicle recognition unit 21. S41 is a rear left end determination step. If it is determined that the rear left end of the stopped vehicle is included in the captured image (YES in S41), the ECU 20 shifts to S44. If it is not determined that the rear left end of the stopped vehicle is included in the captured image (NO in S41), the ECU 20 ends the target vehicle recognition processing without recognizing the stopped vehicle as the target vehicle.

In S42, the ECU 20 determines whether the stopped vehicle is in the right boundary line deviation state by the deviation state determination unit 13. S42 is a fourth boundary line deviation state determination step. If it is determined that the stopped vehicle is in the right boundary line deviation state (YES in S42), the ECU 20 shifts to S43. If it is not determined that the stopped vehicle is in the right boundary line deviation state (NO in S42), the ECU 20 determines that the stopped vehicle is neither the left boundary line deviation state nor the right boundary line deviation state, and ends the target vehicle recognition processing without recognizing the stopped vehicle as the target vehicle.

In S43, the ECU 20 determines whether the rear right edge of the stopped vehicle is included in the captured image by the target vehicle recognition unit 21. S43 is a rear right end determination step. If it is determined that the rear right end of the stopped vehicle is included in the captured image (YES in S43), the ECU 20 shifts to S44. If it is not determined that the rear right end of the stopped vehicle is included in the captured image (NO in S43), the ECU 20 ends the target vehicle recognition processing without recognizing the stopped vehicle as the target vehicle.

In S44, the ECU 20 recognizes the stopped vehicle as the target vehicle which is an avoidance target of steering control by the target vehicle recognition unit 21. S44 is a target vehicle recognition step. Thereafter, the ECU 20 ends the target vehicle recognition processing.

Also in the steering control apparatus 200 according to the second embodiment described above, the target vehicle as a target to be avoided by steering control can be appropriately recognized from the captured image. That is, in the apparatus of related art, when the preceding vehicle or the oncoming vehicle of the host vehicle is turning a curve, if the preceding vehicle or the oncoming vehicle is erroneously determined as the stopped vehicle and the preceding vehicle or the oncoming vehicle is determined as the left boundary line deviation state or the right boundary line deviation state on the captured image captured by the front camera of the host vehicle, the preceding vehicle or the oncoming vehicle turning the curve may be erroneously recognized as the target vehicle for steering control. On the other hand, the steering control apparatus 200 determines whether an end portion is not included in the captured image among end portions of four corners of a preceding vehicle or an oncoming vehicle turning a curve, thereby preventing the preceding vehicle or the oncoming vehicle turning the curve from being erroneously recognized as the target vehicle for the steering control and allowing an appropriate recognition of the target vehicle as a target to be avoided by steering control based on the captured image.

Although the embodiments of the present disclosure have been described above, the present disclosure is not limited to the above-described embodiments. The present disclosure can be implemented in various forms in which various modifications and improvements are made based on the knowledge of those skilled in the art, including the above-described embodiments.

The target vehicle recognition apparatus according to the present disclosure is not necessarily integral with the steering control apparatus. The target vehicle recognition apparatus may be separate from the steering control apparatus, and some of its functions may be performed by a server capable of communicating with the host vehicle. In this case, the host vehicle does not necessarily include all components of the target vehicle recognition apparatus, and the host vehicle serves as a vehicle that performs steering control.

The deviation state determination unit 13 does not necessarily determine the boundary deviation state by using each of the pixel coordinates of the captured image. The deviation state determination unit 13 can perform determination of the boundary deviation state by using various well-known methods. The deviation state determination unit 13 may perform the determination using the detection result of the front radar sensor 2. In this case, the deviation state determination unit 13 may perform boundary line recognition (lane line recognition) as well as recognition of other vehicles based on the detection result of the front radar sensor 2.

The target vehicle recognition unit 21 in the second embodiment may recognize the target vehicle in consideration of the first distance DA and the second distance DB, similarly to the target vehicle recognition unit 14 in the first embodiment.

What is claimed is:

1. A target vehicle recognition apparatus for recognizing a target vehicle to be avoided by steering control of a host vehicle, the apparatus comprising:
   an electronic control unit configured to:
   detect a stopped vehicle located in front of the host vehicle based on at least one of a captured image captured by a front camera of the host vehicle or a detection result of a front radar sensor of the host vehicle;
   determine whether the stopped vehicle is in a forward-facing state to the host vehicle or in a rearward-facing state to the host vehicle based on a captured image of the front camera;
   determine whether the stopped vehicle is in a right boundary line deviation state crossing a right boundary line of a travel lane of the host vehicle, whether the stopped vehicle is in a left boundary line deviation state crossing a left boundary line of the travel lane, or whether the stopped vehicle is neither in the right boundary line deviation state nor the left boundary line deviation state, based on the captured image; and recognize the target vehicle for the steering control based on the captured image, a determination result of the electronic control unit, and a determination result of the electronic control unit, wherein the electronic control unit does not recognize the stopped vehicle as the target vehicle for the steering control when the electronic control unit determines that the stopped vehicle is neither in the right boundary line deviation state nor the left boundary line deviation state, wherein when the electronic control unit determines that the stopped vehicle is in the rearward-facing state and the electronic control unit determines that the stopped vehicle is in the left boundary line deviation state, the electronic control unit recognizes the stopped vehicle as the target vehicle for the steering control when a front left end of the stopped vehicle is not included in the captured image, and does not recognize the stopped vehicle as the target vehicle for the steering control when the front left end of the stopped vehicle is included in the captured image, wherein when the electronic control unit determines that the stopped vehicle is in the rearward-facing state and the electronic control unit determines that the stopped vehicle is in the right boundary line deviation state, the electronic control unit recognizes the stopped vehicle as the target vehicle for the steering control when a front right end of the stopped vehicle is not included in the captured image, and does not recognize the stopped vehicle as the target vehicle for the steering control when the front right end of the stopped vehicle is included in the captured image, wherein when the electronic control unit determines that the stopped vehicle is in the forward-facing state and the electronic control unit determines that the stopped vehicle is in the left boundary line deviation state, the electronic control unit recognizes the stopped vehicle as the target vehicle for the steering control when a rear right end of the stopped vehicle is not included in the captured image, and does not recognize the stopped vehicle as the target vehicle for the steering control when the rear right end of the stopped vehicle is included in the captured image, wherein when the electronic control unit determines that the stopped vehicle is in the forward-facing state, and the electronic control unit determines that the stopped vehicle is in the right boundary line deviation state, the electronic control unit recognizes the stopped vehicle as the target vehicle for the steering control when a rear left end of the stopped vehicle is not included in the captured image, and does not recognize the stopped vehicle as the target vehicle for the steering control when the rear left end of the stopped vehicle is included in the captured image, and wherein the electronic control unit is configured to perform the steering control to avoid the target vehicle in response to recognizing the target vehicle and the captured image by the front camera of the host vehicle.

2. A target vehicle recognition apparatus for recognizing a target vehicle to be avoided by steering control of a host vehicle, the apparatus comprising:

an electronic control unit configured to:

detect a stopped vehicle located in front of the host vehicle based on at least one of a captured image of a front camera captured by the host vehicle or a detection result of a front radar sensor of the host vehicle;

determine whether the stopped vehicle is in a forward-facing state to the host vehicle or in a rearward-facing state to the host vehicle based on a captured image of the front camera;

determine whether the stopped vehicle is in a right boundary line deviation state crossing a right boundary line of a travel lane of the host vehicle, whether the stopped vehicle is in a left boundary line deviation state crossing a left boundary line of the travel lane, or whether the stopped vehicle is neither the right boundary line deviation state nor the left boundary line deviation state, based on the captured image; and recognize the target vehicle for the steering control based on the captured image, a determination result of the electronic control unit, and a determination result of the electronic control unit, wherein the electronic control unit does not recognize the stopped vehicle as the target vehicle for the steering control when the electronic control unit determines that the stopped vehicle is neither in the right boundary line deviation state nor the left boundary line deviation state, wherein when the electronic control unit determines that the stopped vehicle is in the rearward-facing state and the electronic control unit determines that the stopped vehicle is in the left boundary line deviation state, the electronic control unit does not recognize the stopped vehicle as the target vehicle for the steering control when a front right end of the stopped vehicle is not included in the captured image, and recognize the stopped vehicle as the target vehicle for the steering control when the front right end of the stopped vehicle is included in the captured image, wherein when the electronic control unit determines that the stopped vehicle is in the rearward-facing state and the electronic control unit determines that the stopped vehicle is in the right boundary line deviation state, the electronic control unit does not recognize the stopped vehicle as the target vehicle for the steering control when a front left end of the stopped vehicle is not included in the captured image, and recognizes the stopped vehicle as the target vehicle for the steering control when the front left end of the stopped vehicle is included in the captured image, wherein when the electronic control unit determines that the stopped vehicle is in the forward-facing state and the electronic control unit determines that the stopped vehicle is in the left boundary line deviation state, the unit electronic control unit does not recognize the stopped vehicle as the target vehicle for the steering control when a rear left end of the stopped vehicle is not included in the captured image, and recognize the stopped vehicle as the target vehicle for the steering control when the rear left end of the stopped vehicle is included in the captured image, wherein when the electronic control unit determines that the stopped vehicle is in the forward-facing state and the electronic control unit determines that the stopped vehicle is in the right boundary line deviation state, the electronic control unit does not recognize the stopped vehicle as the target vehicle for the steering control when a rear right end of the stopped vehicle is not included in the captured image, and recognize the stopped vehicle as the target vehicle for the steering control when the rear right end of the stopped vehicle is included in the captured image, and wherein the electronic control unit is configured to perform the steering control to avoid the target vehicle in response to recognizing the target vehicle and the captured image by the front camera of the host vehicle.

3. A processing method of a target vehicle recognition apparatus for recognizing a target vehicle to be avoided by steering control of a host vehicle, the method including:
a stopped vehicle detection step for detecting a stopped vehicle located in front of the host vehicle based on at least one of a captured image captured by a front camera of the host vehicle and a detection result of a front radar sensor of the host vehicle;
an orientation determination step for determining whether the stopped vehicle is in a forward-facing state to the host vehicle or in a rearward-facing state to the host vehicle based on a captured image of the front camera;
a deviation state determination step for determining whether the stopped vehicle is in a right boundary line deviation state crossing a right boundary line of a travel lane of the host vehicle, whether the stopped vehicle is in a left boundary line deviation state crossing a left boundary line of the travel lane, or whether the stopped vehicle is neither in the right boundary line deviation state nor the left boundary line deviation state, based on the captured image; and
a target vehicle recognition step for recognizing the target vehicle for the steering control based on the captured image, a determination result of the orientation determination step, and a determination result of the deviation state determination step,
wherein in the target vehicle recognition step, the stopped vehicle is not recognized as the target vehicle for the steering control when the stopped vehicle is determined neither in the right boundary line deviation state nor the left boundary line deviation state in the deviation state determination step,
wherein in the target vehicle recognition step, when the stopped vehicle is determined to be in the rearward-facing state in the orientation determination step and the stopped vehicle is determined to be in the left boundary line deviation state in the deviation state determination step, the stopped vehicle is recognized as the target vehicle when a front left end of the stopped vehicle is not included in the captured image, and the stopped vehicle is not recognized as the target vehicle when the front left end of the stopped vehicle is included in the captured image,
wherein in the target vehicle recognition step, when the stopped vehicle is determined to be in the rearward-facing state in the orientation determination step and the stopped vehicle is determined to be in the right boundary line deviation state in the deviation state determination step, the stopped vehicle is recognized as the target vehicle when a front right end of the stopped vehicle is not included in the captured image, and the stopped vehicle is not recognized as the target vehicle when the front right end of the stopped vehicle is included in the captured image,
wherein in the target vehicle recognition step, when the stopped vehicle is determined to be in the forward-facing state in the orientation determination step and the stopped vehicle is determined to be in the left boundary line deviation state in the deviation state determination step, the stopped vehicle is recognized as the target vehicle when a rear right end of the stopped vehicle is not included in the captured image, and the stopped vehicle is not recognized as the target vehicle when the rear right end of the stopped vehicle is included in the captured image,
wherein in the target vehicle recognition step, when the stopped vehicle is determined to be in the forward-facing state in the orientation determination step and the stopped vehicle is determined to be in the right boundary line deviation state in the deviation state determination step, the stopped vehicle is recognized as the target vehicle when a rear left end of the stopped vehicle is not included in the captured image, and the stopped vehicle is not recognized as the target vehicle when the rear left end of the stopped vehicle is included in the captured image, and
performing the steering control to avoid the target vehicle in response to recognizing the target vehicle and the captured image by the front camera of the host vehicle.

4. The target vehicle recognition apparatus according to claim 1,
wherein the electronic control unit is configured to detect, based on a detection result of the stopped vehicle by the electronic control unit and a captured image of a front camera of the host vehicle, a reference axis extending in an image horizontal direction from a lower end of the stopped vehicle on the captured image, a vehicle left end position obtained by projecting a left end of the stopped vehicle on the reference axis on the captured image, a vehicle right end position obtained by projecting a right end of the stopped vehicle on the reference axis on the captured image, a first reference boundary line position obtained by intersecting left boundary line forming a travel lane of the host vehicle on the captured image and the reference axis, and a second reference boundary line position obtained by intersecting at right boundary line forming a travel lane of the host vehicle on the captured image and the reference axis, and
wherein the electronic control unit is configured to determine the stopped vehicle is in the left boundary line deviation state when the first reference boundary line position sandwiched between the vehicle left end position and the vehicle right end position of the stopped vehicle is present, and determine the stopped vehicle is in the right boundary line deviation state when the second reference boundary line position sandwiched between the vehicle left end position and the vehicle right end position of the stopped vehicle is present.

5. The target vehicle recognition apparatus according to claim 2,
wherein the electronic control unit is configured to detect, based on a detection result of the stopped vehicle by the electronic control unit and a captured image of a front camera of the host vehicle, a reference axis extending in an image horizontal direction from a lower end of the stopped vehicle on the captured image, a vehicle left end position obtained by projecting a left end of the stopped vehicle on the reference axis on the captured image, a vehicle right end position obtained by projecting a right end of the stopped vehicle on the reference axis on the captured image, a first reference boundary line position obtained by intersecting left boundary line forming a travel lane of the host vehicle on the captured image and the reference axis, and a second reference boundary line position obtained by intersecting at right boundary line forming a travel lane of the host vehicle on the captured image and the reference axis, and wherein the electronic control unit is configured to determine the stopped vehicle is in the left boundary line deviation state when the first reference boundary line position sandwiched between the vehicle left end position and the vehicle right end position of the stopped vehicle is present, and determine the stopped vehicle is in the right boundary line deviation state when the second reference boundary line position sandwiched between the vehicle left end position and the vehicle right end position of the stopped vehicle is present.

* * * * *